(12) United States Patent
Tian et al.

(10) Patent No.: US 11,802,985 B2
(45) Date of Patent: Oct. 31, 2023

(54) METHOD AND SYSTEM FOR ANALYZING FILLING FOR KARST RESERVOIR BASED ON SPECTRUM DECOMPOSITION AND MACHINE LEARNING

(71) Applicant: Institute of Geology and Geophysics, Chinese Academy of Sciences, Beijing (CN)

(72) Inventors: Fei Tian, Beijing (CN); Jiangyun Zhang, Beijing (CN); Qingyun Di, Beijing (CN); Wenhao Zheng, Beijing (CN); Zhongxing Wang, Beijing (CN); Yongyou Yang, Beijing (CN); Wenxiu Zhang, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 0 days.

(21) Appl. No.: 17/697,544

(22) Filed: Mar. 17, 2022

(65) Prior Publication Data

US 2023/0083651 A1 Mar. 16, 2023

(30) Foreign Application Priority Data

Sep. 13, 2021 (CN) ......................... 202111066284.0

(51) Int. Cl.
*G01V 1/30* (2006.01)
*G01V 5/12* (2006.01)
*G06N 3/08* (2023.01)

(52) U.S. Cl.
CPC .............. *G01V 1/302* (2013.01); *G01V 1/307* (2013.01); *G01V 1/308* (2013.01); *G01V 5/12* (2013.01); *G06N 3/08* (2013.01)

(58) Field of Classification Search
CPC ........ G01V 1/307; G01V 1/302; G01V 1/308; G01V 5/12; G06N 3/08
See application file for complete search history.

(56) References Cited

U.S. PATENT DOCUMENTS

| 10,288,752 B2* | 5/2019 | Xu .......................... G01V 1/307 |
| 2019/0293818 A1 | 9/2019 | Meek |

FOREIGN PATENT DOCUMENTS

| CN | 103529475 A | 1/2014 |
| CN | 110308488 A | 10/2019 |

(Continued)

OTHER PUBLICATIONS

Wang et la., 'Buried hill karst reservoirs and their controls on productivity', Dec. 2015, KEAI Publication, vol. 42, Issue 6, pp. 1-9 (Year: 2015).*

*Primary Examiner* — Elias Desta

(57) ABSTRACT

The present invention belongs to the field of treatment for data identification and recording carriers, and specifically relates to a method and system for analyzing filling for a karst reservoir based on spectrum decomposition and machine learning, which aims to solve the problems that by adopting the existing petroleum exploration technology, the reservoir with fast lateral change cannot be predicted, and the development characteristics of a carbonate cave type reservoir in a large-scale complex basin cannot be identified. The method comprises: acquiring data of standardized logging curves; obtaining a high-precision 3D seismic amplitude data body by mixed-phase wavelet estimation and maximum posteriori deconvolution and enhancing diffusion filtering. According to the method and the system, the effect of identifying the development characteristics of the carbonate karst cave type reservoir in the large-scale complex basin can be achieved, and the characterization precision is improved.

10 Claims, 10 Drawing Sheets

(56) References Cited

FOREIGN PATENT DOCUMENTS

| CN | 112698392 A | 4/2021 |
|---|---|---|
| CN | 113050157 A | 6/2021 |

* cited by examiner

METHOD AND SYSTEM FOR ANALYZING FILLING FOR KARST RESERVOIR BASED ON SPECTRUM DECOMPOSITION AND MACHINE LEARNING

CROSS-REFERENCE TO RELATED APPLICATIONS

The application claims priority to Chinese patent application No. 2021110662840, filed on Sep. 13, 2021, the entire contents of which are incorporated herein by reference.

TECHNICAL FIELD

The present invention belongs to the field of treatment for data identification and recording carriers, and specifically relates to a method and system for analyzing filling for a karst reservoir based on spectrum decomposition and machine learning.

BACKGROUND

In recent years, deep oil and gas resources in basins are gradually becoming the focus of the field of oil and gas exploration. Deep carbonate rocks have great potential for oil and gas exploration, and this type of oil reservoirs account for 52% of proven oil reserves and 60% of production in the world and are one of the most important oil and gas target areas in many basins in the world. At present, most of the oil and gas in China comes from clastic reservoirs, but carbonate reservoirs are playing an increasingly important role. Marine carbonate reservoirs in China are rich in oil and gas resources, and a large number of oil resources have been found in continental marine basins such as Tarim, Ordos, Sichuan, Bohai Bay and so on, with proven oil reserves of 340×108t, however, the proven rates are only 4.56% and 13.17%. Therefore, the marine carbonate reservoirs have great oil and gas exploitation potential and are the important oil and gas exploration replacement field in China.

Through researching, it is found that the filling characteristics of karst reservoirs have a great influence on oil and gas production capacity. For example, unfilled and semi-filled paleokarst caves are beneficial to oil-gas migration, and can effectively reserve oil and gas and form reservoirs in later adjustment. However, fully filled paleokarst caves are difficult to form effective reservoir spaces. According to the statistics of scholars, sand and mud, cave collapse breccia and chemical fillings occupy more than 70% of the space of the paleokarst cave reservoirs. The difference of lithological and physical properties of the fillings seriously affects the reservoir space and seepage of oil and gas reservoirs.

Carbonate paleokarst reservoirs are complex in spatial distribution and are closely related to each other. The key problems of the research on the paleokarst reservoirs are how to accurately understand the structure of a deeply buried paleokarst system, how to effectively identify the positions of the paleokarst reservoirs by using geophysical data, and how to characterize the internal filling characteristics of a paleokarst cave system with high precision.

Conventional geophysical exploration means are facing the bottleneck problem of identification for the reservoirs. Due to sedimentation, diagenesis and later karst reconstruction, the formed caves and fractures of the carbonate paleokarst reservoirs are scattered and random, which are highly heterogeneous. The exploration experience gained from shallow clastic rocks and porous carbonate reservoirs cannot be directly used in the exploration for the paleokarst reservoirs in Tahe Oilfield. Sparse logging curves have high longitudinal resolution ratio, but the detection range thereof is limited, and the parameters of the reservoirs far away from a wellbore cannot be accurately judged. These characteristics determine that it is difficult to quantify reservoir bodies for fine prediction by the traditional logging detection means.

The paleokarst cave type reservoirs are buried deeply, and the absorption and attenuation of seismic wave energy are strong, which lead to the significant decrease of the dominant frequency of seismic data, greatly reduced resolution ratio and too low signal-to-noise ratio in a deep window. However, drilling data and rock-core samples show that the height of most caves is less than 5 m, and the maximum height is about 15 m, so the resolution ratio of original seismic data is difficult to achieve the accurate identification effect. In addition, compared with the logging curves, seismic attributes contain lower content of lithological and physical information, so that the filling characteristics of the reservoirs cannot be effectively identified.

Therefore, how to make full use of geophysical information to establish the relationship between a high-precision logging interpretation method and large-scale seismic detection data is the key to improve the resolution ratio and the longitudinal and horizontal detection capabilities of the reservoir prediction.

Well-to-seismic joint inversion can be adopted for transforming seismic reflection data into quantitative estimation of rock properties, which is widely used in the reservoir prediction. The well-to-seismic joint inversion based on geostatistics is to integrate multi-category and multi-scale data such as logging data, seismic data and the like according to the variation function changing with distance by using the principle of geostatistics and under the guidance of a geological model, which can realize the distinction between the paleokarst caves and compact surrounding rocks, and on the basis, the lithological and physical parameters of the reservoir bodies can be characterized. Due to the geological advantage of the idea of geostatistics in reservoir modeling, the theoretical problems of detection accuracy and detection range in the geophysical exploration field are solved, the limit to the seismic resolution ratio is broken through, and the effect of random simulation for thin reservoirs is achieved. However, the optimization for sample wells in the method depends on a prior model and refers to the variation function changing with distance. The seismic data only plays a role in optimizing random simulation results, without considering the contribution of seismic information to optimization for samples. As a result, the inversion result is directly controlled by inter-well interpolation in the high-frequency band, and the lateral prediction is highly random, so the reservoirs with fast lateral change cannot be predicted.

SUMMARY

In order to solve the technical problems of reservoir identification at present, namely, the problems that the inversion result is directly controlled by inter-well interpolation in the high-frequency band, the lateral prediction is highly random, and a reservoir with fast lateral change cannot be predicted, which are caused by that in the existing methods for analyzing the filling characteristics of a cave type reservoir in petroleum exploration, only geological data is regarded as the optimization of a random simulation structure, and the contribution of seismic information to the optimization for logging samples is not considered, the present invention provides a method for analyzing filling for a karst reservoir based on spectrum decomposition and machine learning, which comprises the following steps:

Step S100, acquiring original geophysical logging data: acquiring original logging data of each sample well by logging equipment, comprising: measuring the self-potential SP of each sample well by a measuring electrode, measuring the natural gamma ray GR of each sample well by a natural gamma ray downhole device and a natural gamma ray ground instrument, and acquiring the caliper CAL of each sample well by a caliper arm; and acquiring data of a resistivity curve: deep lateral logging RLLD, shallow lateral logging RLLS and micro-lateral logging RLLM, and data of a physical property characterization curve: compensated neutrons CNL, a compensated acoustic curve AC and a density curve DEN by traditional logging equipment; and acquiring definite lithological information and physical information of an individual depth segment based on imaging logging information, drilling information, mud logging information and rock-core information, so as to determine depth data of a marker bed at a target horizon;

Step S200, acquiring seismic data: acquiring data of an original seismic wave reflected signal by a seismic wave excitation device and a receiving device and acquiring isochronous 3D (Three-Dimensional) distribution of the marker bed at the target horizon according to the waveform of the data of the original seismic wave reflected signal;

Step S300, preprocessing original geophysical logging data: drawing data of logging curves based on all original logging data of the sample wells and carrying out abnormal value processing and standardization processing, so as to obtain data of standardized logging curves;

Step S400, preprocessing the seismic data: obtaining a high-precision 3D seismic amplitude data body by mixed-phase wavelet estimation and maximum posteriori deconvolution and enhancing diffusion filtering based on the data of the seismic wave reflected signal;

Step S500, carrying out well-to-seismic calibration and selecting the characteristic parameters: acquiring a wave impedance curve of each sample well based on the compensated acoustic curve AC and the density curve DEN in the data of the standardized logging curve, so as to calculate a reflection coefficient curve; acquiring the preferred frequency of the ricker wavelet, so that the preferred frequency is consistent with the dominant frequency of the high-precision 3D seismic amplitude data body; carrying out convolution operation on the ricker wavelet and the reflection coefficient curve, so as to obtain a synthetic seismic record; comparing the depth data of the marker bed at the target horizon and the isochronous 3D distribution of the marker bed at the target horizon for well-to-seismic calibration; calculating the correlation between the synthetic seismic record and the waveform of a near-well seismic channel; and when the correlation is more than or equal to a preset first threshold, judging that the result of well-to-seismic calibration is qualified, so as to obtain the time-depth transforming relationship between the data of the logging curve and the seismic record and the characteristic parameters sensitive to the reservoir, wherein a method for obtaining the characteristic parameters sensitive to the reservoir comprises:

drawing a columnar statistical graph of responses of the logging parameters, which are generated to different geological bodies near the wells; and when the numerical value of data of a certain standardized logging curve can be used for distinguishing data points that are more than a second threshold preset by different logging interpretation conclusions, selecting the data of the standardized logging curve as the characteristic parameters sensitive to the reservoir, wherein the characteristic parameters sensitive to the reservoir at least comprise the wave impedance IMP and can also comprise one or more of the caliper CAL, the natural gamma ray GR, the self-potential SP, the data of the resistivity curve: the deep lateral logging RLLD, the shallow lateral logging RLLS and the micro-lateral logging RLLM, and the data of the physical property characterization curve: the compensated neutrons CNL, the compensated acoustic curve AC and the density curve DEN;

Step S600, constructing an isochronous framework model: constructing the isochronous framework model based on the law of sedimentary strata reflected by the high-precision 3D seismic amplitude data body and the time-depth transforming relationship;

Step S700, simulating the parameters of an inter-well reservoir: based on the data of the standardized logging curve of each sample well, determining the parameter of the optimal sample number, which can reflect the overall geological condition; selecting data of the characteristic parameters sensitive to the reservoir of the sample wells to construct an initial model, wherein the data has the highest correlation of the seismic waveforms, and the number of pieces of data is equal to the parameter of the optimal sample number; constantly correcting the parameters of the initial model; and outputting high-precision characteristic value simulation result data bodies, wherein the high-precision characteristic value simulation result data bodies are data bodies corresponding to the characteristic parameters sensitive to the reservoir one to one;

Step S800, characterizing the boundary of an inter-well karst cave system: drawing a histogram of the wave impedance curves based on the wave impedance curves IMP of the sample wells in the characteristic parameters sensitive to the reservoir, and determining the wave impedance threshold for distinguishing a paleokarst cave and a surrounding rock; and based on the wave impedance threshold of the paleokarst cave and the surrounding rock, defining the region that is greater than the wave impedance threshold for distinguishing the paleokarst cave and the surrounding rock in the high-precision characteristic value simulation result data bodies as a bed rock of a carbonate rock, and defining the region that is lower than the wave impedance threshold for distinguishing the paleokarst cave and the surrounding rock as the development position of the paleokarst cave type reservoir, so as to obtain the structure characteristics and the spatial distribution law of the paleokarst cave type reservoir;

Step S900, characterizing the lithological and physical boundaries of internal filling of the cave: constructing a cross plot based on the characteristic parameters sensitive to the reservoir, and carrying out box selection on data points in the cross plot as logging interpretation sample points according to the lithological information and the physical information of the individual depth segment, so as to obtain the interpretation conclusion threshold of the filling degree and the types of fillings;

carrying out cross analysis on the high-precision characteristic value simulation result data bodies by the interpretation conclusion threshold, so as to obtain the internal filling degree of the cave and the characteristics of the 3D spatial morphologies of the combination of the fillings; and Step S1000, describing the structure of the paleokarst cave and the filling for the paleokarst cave: based on the structure characteristics and the spatial distribution law of the paleokarst cave type reservoir as well as the internal filling degree of the cave and the characteristics of the 3D spatial morphologies of the combination of the fillings, engraving the spatial distribution of the paleokarst cave and the development characteristics of the internal filling by adopting a lithology shielding technology and a 3D engraving technology.

In some preferred implementation manners, the step of measuring the self-potential SP of each sample well by the measuring electrode and measuring the natural gamma ray GR of each sample well by the natural gamma ray downhole device and the natural gamma ray ground instrument specifically comprises:

measuring the self-potential SP of each sample well by the measuring electrode:

arranging a measuring electrode N on the ground and arranging a measuring electrode M under the well by a cable;

lifting the measuring electrode M along the well axis to measure the change of the self-potential with the well depth, wherein a calculation method of the value of the self-potential is shown as follows:

$$E_A = E_d - E_{da} = (K_d - K_{da})lg\frac{R_{mf}}{R_w} = Klg\frac{R_{mf}}{R_W}$$

wherein $E_A$ represents the total self-potential; $K_d$ represents the coefficient of diffusion potential; $K_{da}$ represents the coefficient of diffusion and adsorption potential; $R_{mf}$ represents the value of resistivity of mud filtrate; and $R_W$ represents the value of resistivity of stratum water; and measuring the natural gamma ray GR of each sample well by the natural gamma ray downhole device and the natural gamma ray ground instrument:

wherein the natural gamma ray downhole device comprises a detector, an amplifier and a high-voltage power supply;

acquiring the natural gamma ray by the detector, transforming the natural gamma ray into an electric pulse signal and amplifying the electric pulse signal by the amplifier; and transforming the number of electric pulses formed in each minute into the potential difference and recording the potential difference by the ground instrument.

In some preferred implementation manners, Step S300 comprises:

Step S310, drawing data of an original logging curve based on the original logging data;

Step S320, removing outliers to obtain data of the logging curve with the outliers removed based on the data of the original logging curve; and Step S330, superposing all data of a histogram of the single logging curve at the positions of the sample wells in a work area based on the data of the logging curve with the outliers removed, and integrating the thresholds to obtain the data of the standardized logging curve.

In some preferred implementation manners, Step S400 specifically comprises:

Step S410, based on the data of the seismic wave reflected signal, expressing a frequency domain seismic record convolution model as:

$$s(\omega)=\sigma(\omega)\varepsilon(\omega)$$

wherein $s(\omega)$ represents the seismic record after Fourier transformation; $\sigma(\omega)$ represents the wavelet after Fourier transformation; $\varepsilon(\omega)$ represents the frequency spectrum of the reflection coefficient after Fourier transformation; and $\omega$ represents the angular frequency;

Step S420, transforming logarithms on the two sides of the equation of the frequency domain seismic record convolution model into a linear system to obtain a linear seismic record convolution model:

$$\ln s(\omega)=\ln \sigma(\omega)+\ln \varepsilon(\omega)$$

Step S430, carrying out inverse Fourier transformation on the linear seismic record convolution model to obtain a complex cepstrum sequence:

$$\tilde{s}(t)=\tilde{\sigma}(t)+\tilde{\varepsilon}(t)$$

wherein $\tilde{s}(t)$ represents a complex cepstrum sequence of a seismic waveform record; $\tilde{\sigma}(t)$ represents a complex cepstrum sequence of the seismic wavelet; $\tilde{\varepsilon}(t)$ represents a complex cepstrum sequence of the stratum reflection coefficient; and t represents the time of the seismic waveform record;

Step S440, based on the complex cepstrum sequence, separating the wavelet and the reflection coefficient by a low-pass filter and extracting a wavelet amplitude spectrum;

Step S450, acquiring a simulated seismic wavelet amplitude spectrum by a least square method:

$$\sigma(f)=A(f)f^\alpha e^{H(f)}$$

wherein the fitting parameter $\alpha \geq 0$ of the least square method is a constant; $\sigma(f)$ represents the wavelet amplitude spectrum; $H(f)$ and $A(f)$ represent the polynomials off; and f represents the frequency of the seismic wavelet;

Step S460, based on the simulated seismic wavelet amplitude spectrum, obtaining the maximum phase component and the minimum phase component of the wavelet, wherein it is assumed that the maximum phase component of the wavelet $\sigma(t)$ is u(t), and the minimum phase component of the wavelet $\sigma(t)$ is v(t), the wavelet $\sigma(t)$ is:

$$\sigma(t)=u(t)\cdot v(t)$$

and the complex cepstrum of the amplitude spectrum is expressed as follows:

$$2\tilde{\sigma_0}(t)=\tilde{u}(t)+\tilde{v}(t)+\tilde{u}(-t)+\tilde{v}(-t)$$

wherein the complex cepstrum $\tilde{\sigma_0}(t)$ of the amplitude spectrum is displayed symmetrically on the positive axis and the negative axis; $\tilde{v}(-t)$ represents the complex cepstrum of the minimum phase function corresponding to the maximum phase component v(t) of the seismic wavelet; and $\tilde{u}(-t)$ represents the complex cepstrum of the maximum phase function corresponding to the minimum phase component u(t) of the seismic wavelet;

Step S470, based on the complex cepstrum in the amplitude spectrum, determining a group of mixed-phase wavelet sets with the same amplitude spectrum; constantly adjusting the parameters of the Yu wavelet; keeping the low frequency, broadening the high frequency and properly increasing the dominant frequency to construct the expected output wavelet form; and looking for the best balance point for improving the resolution ratio and the fidelity with reference to a signal-to-noise ratio spectrum under the control of the logging curves, so as to obtain data of the waveform after shaping;

Step S480, based on the data of the waveform after shaping, constructing a tensor diffusion model:

$$\begin{cases} \frac{\partial U}{\partial \tau} = div(D \cdot \nabla U) \\ U|_{\tau=0} = U_0 \end{cases}$$

wherein $\tau$ represents the diffusion time; div represents the divergence operator; D represents the tensor type diffusion coefficient of a diffusion filter; U represents the diffusion filtering result; $U|_{\tau=0}$ represents the diffusion filtering result when $\tau=0$; $U_0$ represents the data of the waveform after shaping when $\tau=0$; and as the initial condition of the tensor diffusion model, $\nabla U$ represents the gradient of the diffusion filtering result;

based on the tensor diffusion model, constructing the gradient structure tensor:

$J_\beta(\nabla U) = G_\rho * J_0 = G_\rho * (\nabla U (\nabla U)^T)$ wherein U represents the diffusion filtering result, and $J_0$ represents the tensor product of the gradient vector;

the Gaussian function with the scale of p is expressed by $G_\rho$:

$G_\rho(r) = (2\pi\rho^2)^{-3/2} \exp(-|r|^2/(2\rho^2))$ wherein r represents the calculation radius;

the characteristic vector of the structure tensor is:

$$J_\rho(\nabla U) = (v_1 \ v_2 \ v_3) \begin{pmatrix} \lambda_1 & 0 & 0 \\ 0 & \lambda_2 & 0 \\ 0 & 0 & \lambda_3 \end{pmatrix} (v_1 \ v_2 \ v_3)^T$$

wherein $v_1$, $v_2$ and $v_3$ represent three characteristic vectors of the gradient structure tensor and can be regarded as a local orthogonal coordinate system; $v_1$ points to the gradient direction of the seismic signal; a plane formed by $v_2$ and $v_3$ is in parallel to the local structure characteristics of the seismic signal; and $\lambda_1$, $\lambda_2$ and $\lambda_3$ represent three characteristic values corresponding to $v_1$, $v_2$ and $v_3$ respectively;

Step S490, based on the characteristic vector of the structure tensor, respectively calculating the confidence degree of a linear structure, the confidence degree of a face structure and the diffusion tensor, wherein the confidence degree $C_{line}$ of the linear structure is:

$$C_{line} = \frac{\lambda_2 - \lambda_3}{\lambda_2 + \lambda_3}$$

the confidence degree $C_{plane}$ of the face structure is:

$$C_{plane} = \frac{\lambda_1 - \lambda_2}{\lambda_1 + \lambda_2}$$

and the diffusion tensor D is:

$$D = (v_1 \ v_2 \ v_3) \begin{pmatrix} \mu_1 & 0 & 0 \\ 0 & \mu_2 & 0 \\ 0 & 0 & \mu_3 \end{pmatrix} (v_1 \ v_2 \ v_3)^T = \begin{pmatrix} D_{11} & D_{12} & D_{13} \\ D_{21} & D_{22} & D_{23} \\ D_{31} & D_{32} & D_{33} \end{pmatrix}$$

wherein $\mu_1$, $\mu_2$ and $\mu_3$ represent three non-negative characteristic values of the diffusion tensor and respectively represent the intensity of filtering of the diffusion filter in the three characteristic directions $v_1$, $v_2$ and $v_3$; and Step S4100, repeating the steps S480-S490 until the preset number of iterations is achieved, so as to obtain the diffusion filtering result, i.e. the high-precision 3D seismic amplitude data body.

In some preferred implementation manners, a calculation method of the simulated seismic wavelet amplitude spectrum comprises:

positioning the maximum value of an amplitude spectrum in the data of the seismic wave reflected signal and the frequency corresponding to the maximum value;

fitting the maximum value of the amplitude spectrum of the seismic signal and the simulated seismic wavelet amplitude spectrum by the least square method to obtain the coefficients of the polynomials of the parameters $\alpha$ and H(f), so as to obtain the fit amplitude value of the corresponding frequency of the maximum value; and dividing the fit amplitude value of the corresponding frequency by the maximum value of the amplitude spectrum of the seismic signal, so as to fit the coefficient of the polynomial A(f) by the quotient.

In some preferred implementation manners, the time-depth transforming relationship between the data of the logging curve and the seismic record is:

$T_s = T_{H_0} + 2\Sigma_{i=1}^n T_i \cdot \Delta H$ wherein $T_{H_0}$ represents the time of the seismic signal corresponding to the initial depth of acoustic logging; $T_i$ represents the time difference of the acoustic wave; i represents the sequence number of time operation between every two sampling points; $\Delta H$ represents the sampling interval of the data of the logging curve; and $T_s$ represents the two-way travel time of the seismic wave.

In some preferred implementation manners, Step S700 specifically comprises Step S710-Step S790:

Step S710, optionally selecting a sample well as a reference target well and setting the parameter of the initial sample number as 1;

Step S720, according to the principle of similarity of the waveforms, selecting data of the characteristic parameters of the standardized logging curves of the sample wells and data of the characteristic parameters of a standardized logging curve of the reference target well for correlation analysis, so as to obtain the correlation value of the parameter of the sample number and the characteristic parameters of the curve of the reference target well, wherein the number of pieces of data of the characteristic parameters of the standardized logging curves of the sample wells is equal to the parameter of the sample number;

Step S730, increasing the parameter of the sample number 1 by 1; repeating the method of Step S720 to obtain the correlation value of the parameter of the sample number and the characteristic parameters of the curve of the reference target well, which corresponds to each parameter of the sample number; and connecting all the correlation values of the parameter of the sample number and the characteristic parameters of the curve of the reference target well, so as to obtain a correlation curve with the correlation of the characteristic parameters of the curve of the reference well changing with the parameter of the sample number;

Step S740, selecting another sample well as a reference target well; repeating the methods of Step S710-Step S730 to obtain multiple correlation curves with the correlation of the characteristic parameters of the curve of the reference well changing with the parameter of the sample number; fitting all the correlation curves with the correlation of the characteristic parameters of the reference well changing with the parameter of the sample number into an overall correlation curve; selecting an inflection point capable of enabling the correlation in the overall correlation curve to be increased with the increase of the parameter of the sample number and to be finally kept at a stable position; and determining the parameter of the optimal sample number;

Step S750, based on the high-precision 3D seismic amplitude data body and the isochronous framework model, calculating the correlations of the waveforms of point positions to be detected and the positions of the sample wells; sorting the correlations of the waveforms from large to small; selecting the data of the characteristic parameters sensitive to the reservoir of the sample wells, wherein the data has the highest correlation of the seismic waveforms, and the number of pieces of data is equal to the parameter of the optimal sample number; and based on the sample well corresponding to the characteristic data of the seismic waveform of the sample well with the highest correlation, constructing the initial model by an inter-well characteristic parameter interpolation manner;

Step S760, based on the initial model, selecting the characteristic parameters sensitive to the reservoir corresponding to the to-be-simulated curve parameters of the sample wells as prior information, wherein the characteristic parameters sensitive to the reservoir have the highest correlation of the seismic waveforms, the number of characteristic parameters sensitive to the reservoir is equal to the parameter of the optimal sample number, and the to-be-simulated curve parameters are curve parameters corresponding to the characteristic parameters sensitive to the reservoir one to one, at least comprise the wave impedance IMP and can also comprise one or more of the caliper CAL, the natural gamma ray GR, the self-potential SP, the data of the resistivity curve: the deep lateral logging RLLD, the shallow lateral logging RLLS and the micro-lateral logging RLLM, and the data of the physical property characterization curve: the compensated neutrons CNL, the compensated acoustic curve AC and the density curve DEN;

Step S770, carrying out matched filtering on the initial model and the prior information, so as to obtain the maximum likelihood function;

Step S780, based on the maximum likelihood function and the prior information, solving the statistical distribution density of the posterior probabilities under a Bayesian framework, and sampling the statistical distribution density of the posterior probabilities to obtain the objective function; and Step S790, sampling the distribution of the posterior probabilities by an MCMC (Markov Chain Monte Carlo) method and the criterion for Metropolis-Hastings sampling and by taking the objective function as the input of the initial model; constantly optimizing the parameters of the initial model; selecting the solution when the maximum value is selected for the objective function as random implementation; selecting the average value of multiple random implementations as the expected output value; and taking the expected output value as the high-precision characteristic value simulation result data bodies, wherein the parameters in the high-precision characteristic value simulation result data bodies correspond to the characteristic parameters sensitive to the reservoir one to one.

In some preferred implementation manners, Step S780 specifically comprises:

Step S781, by utilizing the law that the white noise meets Gaussian distribution, expressing the parameter of the high-precision characteristic value simulation result data body as:

$$Y=X+N$$

wherein Y represents the parameter of the high-precision characteristic value simulation result data body, X represents the to-be-solved actual characteristic parameter value of the subsurface stratum, and N represents the random noise;

Step S782, as $\|X-X_p\|^2$ also meets Gaussian distribution, determining the initial objective function as:

$$J_1 = \frac{\|X - X_p\|^2}{2\sigma^2}$$

wherein $J_1$ represents the function related to posterior information; $X_p$ represents the expected value of the characteristic parameter, which is obtained by calculation after the steps of selecting the sample wells based on the optimal sample number, carrying out matched filtering on characteristic curves of the sample wells and then solving the statistical distribution density of the posterior probabilities; and $\sigma$ represents the covariance of the white noise; and Step S783, based on the initial objective function, introducing the prior information into the objective function by maximum posterior estimation, so as to obtain the following stable objective function:

$$J(Z)=J_1(Z)+\lambda^2 J_2(Z)$$

wherein Z represents the characteristic parameter to be simulated; $J_2$ represents the function related to the prior information of the geological data and the logging data; and $\lambda$ represents the smoothing parameter used for coordinating the mutual effect between $J_1$ and $J_2$.

In some preferred implementation manners, Step S790 specifically comprises:

Step S791, setting M as the target space, setting n as the total sample number and setting m as the sample number when the Markov chain tends to be stable;

Step S792, presetting a Markov chain to enable the Markov chain to be converged to stable distribution;

Step S793, starting from a certain point $Z_0$ in M, carrying out sampling simulation by the Markov chain and generating a point sequence: $Z_1, \ldots, Z_n$;

Step S794, expressing the expected estimation of the function $J_2(Z)$ as:

$$E[J_2(Z)] = \frac{1}{n-m} \sum_{k=m+1}^{n} f(Z^{(k)})$$

wherein n represents the generated total sample number, m represents the sample number when the Markov chain is stable, and k represents the accumulated parameter;

Step S795, selecting the transition function $q(Z; Z^{(i-1)})$ and the initial value $Z^{(0)}$, wherein if the parameter value when the $i^{th}$ iteration is started is $Z^{(i-1)}$, the $i^{th}$ iteration process comprises:

extracting the alternative value $Z'$ from $q(Z; Z^{(i-1)})$ and calculating the probability of acceptance $\alpha(Z^{(i-1)}), Z')$ of the alternative value $Z'$:

$$\alpha(Z^{(i-1)}, Z') = \min\left\{\frac{\pi(Z^{(i-1)}; Z')}{\pi(Z^{(i-1)}q(Z'; Z^{(i-1)}))}\right\}$$

Step S796, enabling $Z^{(i)}=Z'$ with $\alpha(Z^{(i-1)}, Z')$ and enabling $Z^{(i)}=Z^{(i-1)}$ with the probability $1-\alpha(Z^{(i-1)}, Z')$; and Step S797, constantly disturbing the parameters of the initial model, repeating the methods of Step S792-Step S796 to achieve the preset number of iterations n, and obtaining posterior samples $Z^{(1)} Z^{(2)} Z^{(3)} \ldots Z^{(n)}$ so as to calculate the matrix at each order of posterior distribution to obtain the expected output value, wherein the expected output value is taken as the high-precision characteristic value simulation result data bodies.

In some preferred implementation manners, Step S900 preferably comprises:

Step S910, constructing a template of the cross plot by taking the wave impedance value and the natural GR value as the characteristic parameters sensitive to the reservoir;

Step S920, based on the template of the cross plot and according to the lithological information and the physical information of the individual depth segment, dividing the sample points into fully filled sample points, semi-filled sample points and bed rock sample points;

Step S930, carrying out box selection on the semi-filled sample points with the better reservoir property and calculating to obtain the 2D (Two-Dimensional) cross plot interpretation conclusion threshold; and Step S940, inputting the 2D cross plot interpretation conclusion threshold into a 3D natural GR characteristic parameter simulation data body and a wave impedance inversion data body and characterizing the spatial structure morphology of a semi-filled reservoir, so as to obtain the characteristics of the 3D spatial morphology of the semi-filled part of the paleokarst cave; and in an implementation manner of identifying the fillings, Step S900 also comprises the step of acquiring other characteristics of the paleokarst cave:

Step S950, based on the template of the cross plot and according to the lithological information and the physical information of the individual depth segment, dividing the sample points into bed rock sample points, sedimentation filled sample points, chemically filled sample points, collapse filled sample points and mixed filled sample points; carrying out box selection on sample points of all types of fillings; respectively calculating the corresponding interpretation conclusion thresholds; and respectively characterizing the corresponding spatial structure morphologies, so as to obtain the characteristics of the 3D spatial morphologies of the fillings of the paleokarst cave.

Another aspect of the present invention provides a system for analyzing filling for the karst reservoir based on spectrum decomposition and machine learning. The system comprises: an original geophysical logging data acquisition module, a seismic data acquisition module, an original geophysical logging data preprocessing module, a seismic data preprocessing module, a well-to-seismic calibration and characteristic parameter selection module, an isochronous framework model constructing module, an inter-well characteristic parameter simulation module, a module for characterizing the boundary of the inter-well karst cave system, a module for characterizing the lithological and physical boundaries of internal filling of the karst cave and a 3D module for describing the structure and the filling characteristics of the paleokarst cave;

the original geophysical logging data acquisition module is configured to acquire the original logging data of each sample well by the logging equipment, comprising: measuring the self-potential SP of each sample well by the measuring electrode, measuring the natural gamma ray GR of each sample well by the natural gamma ray downhole device and the natural gamma ray ground instrument, and acquiring the caliper CAL of each sample well by the caliper arm; and acquiring the data of the resistivity curve: the deep lateral logging RLLD, the shallow lateral logging RLLS and the micro-lateral logging RLLM, and the data of the physical property characterization curve: the compensated neutrons CNL, the compensated acoustic curve AC and the density curve DEN by the traditional logging equipment; and acquire the definite lithological information and physical information of the individual depth segment based on the imaging logging information, the drilling information, the mud logging information and the rock-core information, so as to determine the depth data of the marker bed at the target horizon;

the seismic data acquisition module is configured to acquire the data of the original seismic wave reflected signal by the seismic wave excitation device and the receiving device and acquire isochronous 3D distribution of the marker bed at the target horizon according to the waveform of the data of the original seismic wave reflected signal;

the original geophysical logging data preprocessing module is configured to draw the data of the logging curves based on the original logging data of the sample wells and carry out abnormal value processing and standardization processing, so as to obtain the data of the standardized logging curves;

the seismic data preprocessing module is configured to obtain the high-precision 3D seismic amplitude data body by mixed-phase wavelet estimation and maximum posteriori deconvolution and enhancing diffusion filtering based on the data of the seismic wave reflected signal;

the well-to-seismic calibration and characteristic parameter selection module is configured to acquire the wave impedance curve of each sample well based on the compensated acoustic curve AC and the density curve DEN in the data of the standardized logging curve, so as to calculate the reflection coefficient curve; acquire the preferred frequency of the ricker wavelet, so that the preferred frequency is consistent with the dominant frequency of the high-precision 3D seismic amplitude data body; carry out convolution operation on the ricker wavelet and the reflection coefficient curve, so as to obtain the synthetic seismic record; compare the depth data of the marker bed at the target horizon and the isochronous 3D distribution of the marker bed at the target horizon for well-to-seismic calibration; calculate the correlation between the synthetic seismic record and the waveform of the near-well seismic channel; and when the correlation is more than or equal to the preset first threshold, judge that the result of well-to-seismic calibration is qualified, so as to obtain the time-depth transforming relationship between the data of the logging curve and the seismic record and the characteristic parameters sensitive to the reservoir, wherein the method for obtaining the characteristic parameters sensitive to the reservoir comprises:

drawing the columnar statistical graph of the responses of logging parameters, which are generated to the different geological bodies near the wells; and when the numerical value of the data of the certain standardized logging curve can be used for distinguishing the data points that are more than the second threshold preset by the different logging interpretation conclusions, selecting the data of the standardized logging curve as the characteristic parameters sensitive to the reservoir, wherein the characteristic parameters sensitive to the reservoir at least comprise the wave impedance IMP and can also comprise one or more of the caliper CAL, the natural gamma ray GR, the self-potential SP, the data of the resistivity curve: the deep lateral logging RLLD, the shallow lateral logging RLLS and the micro-lateral logging RLLM, and the data of the physical property characterization curve: the compensated neutrons CNL, the compensated acoustic curve AC and the density curve DEN;

the isochronous framework model constructing module is configured to construct the isochronous framework model based on the law of sedimentary strata reflected by the high-precision 3D seismic amplitude data body and the time-depth transforming relationship;

the inter-well characteristic parameter simulation module is configured to determine the parameter of the optimal sample number, which can reflect the overall geological condition, based on the data of the standardized logging curve of each sample well; select the data of the characteristic parameters sensitive to the reservoir of the sample wells to construct the initial model, wherein the data has the highest correlation of the seismic waveforms, and the number of pieces of data is equal to the parameter of the optimal sample number; constantly correct the parameters of the initial model; and output the high-precision characteristic value simulation result data bodies, wherein the high-precision characteristic value simulation result data bodies are the data bodies corresponding to the characteristic parameters sensitive to the reservoir one to one;

the module for characterizing the boundary of the inter-well karst cave system is configured to draw the histogram of the wave impedance curves based on the wave impedance curves IMP in the characteristic parameters sensitive to the reservoir of the sample wells, and determine the wave impedance threshold for distinguishing the paleokarst cave and the surrounding rock; and based on the wave impedance threshold of the paleokarst cave and the surrounding rock, define the region that is greater than the impedance threshold in the high-precision characteristic value simulation result data bodies as the bed rock of the carbonate rock, and define the region that is lower than the impedance threshold as the development position of the paleokarst cave type reservoir, so as to obtain the structure characteristics and the spatial distribution law of the paleokarst cave type reservoir;

the module for characterizing the lithological and physical boundaries of internal filling of the karst cave is configured to characterize the lithological and physical boundaries of internal filling of the cave: constructing the cross plot based on the characteristic parameters sensitive to the reservoir, and carrying out box selection on the data points in the cross plot as the logging interpretation sample points according to the lithological information and the physical information of the individual depth segment, so as to obtain the interpretation conclusion threshold of the filling degree and the types of the fillings; and carrying out cross analysis on the high-precision characteristic value simulation result data bodies by the interpretation conclusion threshold, so as to obtain the internal filling degree of the cave and the characteristics of the 3D spatial morphologies of the combination of the fillings; and the 3D module for describing the structure and the filling characteristics of the paleokarst cave is configured to describe the structure and the filling of the paleokarst cave: based on the structure characteristics and the spatial distribution law of the paleokarst cave type reservoir as well as the internal filling degree of the cave and the characteristics of the 3D spatial morphologies of the combination of the fillings, engraving the spatial distribution of the paleokarst cave and the development characteristics of the internal filling by adopting the lithology shielding technology and the 3D engraving technology.

The third aspect of the present invention provides electronic equipment, which comprises at least one processor and a memory that is in communication connection with the at least one processor, wherein the memory is configured to store instructions capable of being executed by the processor(s); and the instructions are used for being executed by the processor(s) for realizing the method for analyzing filling for the karst reservoir based on spectrum decomposition and machine learning.

The fourth aspect of the present invention provides a computer readable storage medium; the computer readable storage medium is configured to store computer instructions; and the computer instructions are used for being executed by a computer for realizing the method for analyzing filling for the karst reservoir based on spectrum decomposition and machine learning.

The method and the system of the present invention have the beneficial effects that:

the impedance and other lithological and physical parameters of the reservoir are simulated through well-to-seismic integration based on an initial isochronous geological framework model by utilizing the correlation between high-precision 3D seismic waveform data; and the wave impedance threshold of the paleokarst cave type reservoir and the interpretation threshold of the lithology of the fillings are obtained according to the logging data, so as to characterize the formation structure of the reservoir and the type of the combination of the fillings, so that the characterization precision is improved, the reservoir with fast lateral change can be predicted, and the reliable theoretical basis is provided for evaluating the reservoir property and the oil-gas migration of a carbonate paleokarst cave.

According to the method and the system of the present invention, the mapping relationship between geophysical detection methods is established by adopting the Markov chain sampling criterion and a Monte Carlo estimation method under the guidance of the Bayesian theory, so as to achieve the effect of identifying the development characteristics of a carbonate paleokarst cave type reservoir in a large-scale complex basin.

BRIEF DESCRIPTION OF DRAWINGS

Other characteristics, purposes and advantages of the present application become more apparent by reading the detailed description for non-restrictive embodiments with reference to the following drawings.

DETAILED DESCRIPTION OF THE EMBODIMENTS

Figure 1:
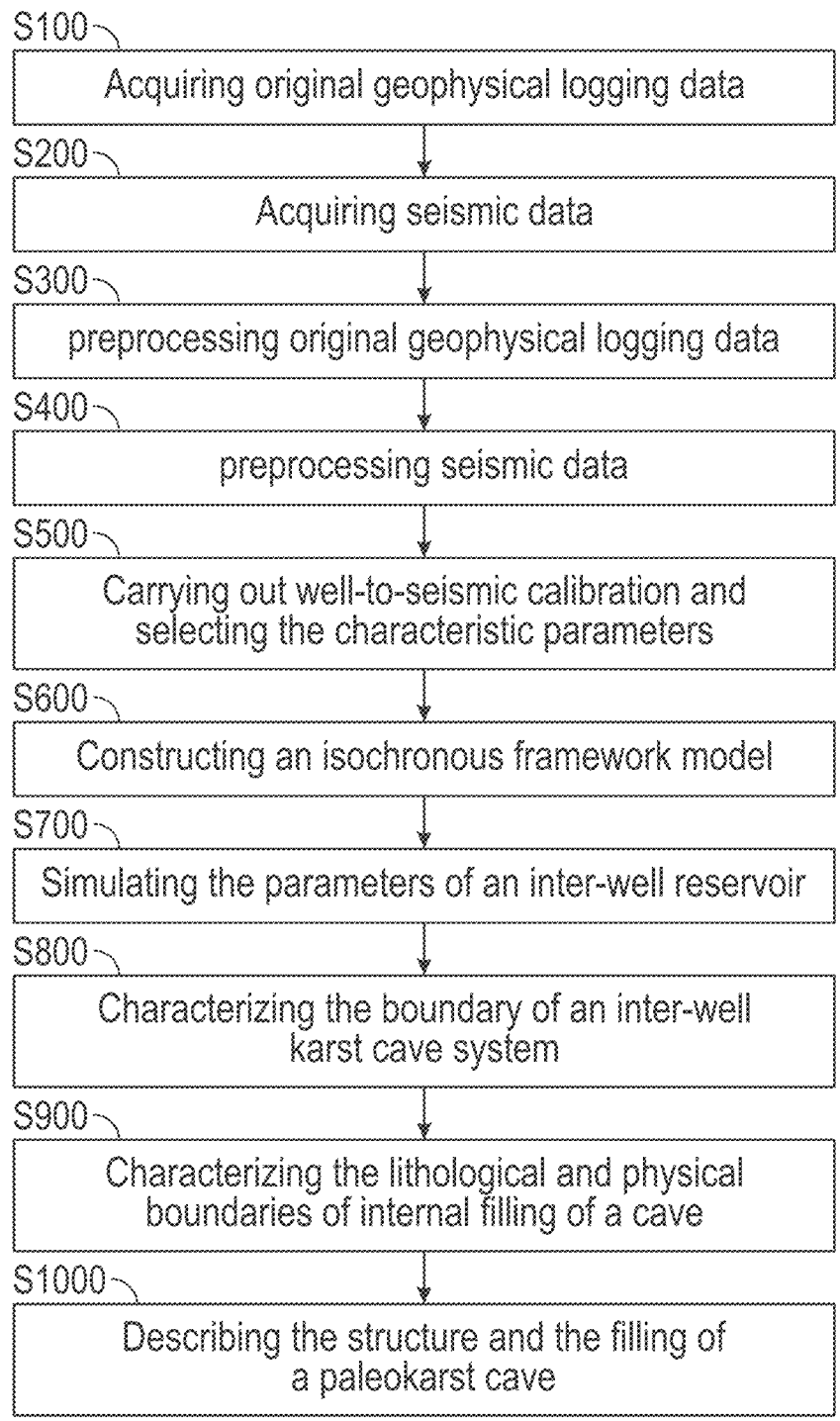
FIG. 1 is a schematic diagram of the flow of embodiments of a method for analyzing filling for a karst reservoir based on spectrum decomposition and machine learning of the present invention.

The present application is further described in details hereinafter through combination with the drawings and embodiments. It should be understood that the specific embodiments described here are only used for explaining related inventions, but are not used for limiting the present invention. In addition, it should also be noted that in order to describe the present invention conveniently, only the parts related to the related inventions are shown in the drawings.

It should be noted that the embodiments in the present application and the characteristics in the embodiments can be combined with each other in case of no conflict. The present application is described in details hereinafter with reference to the drawings and through combination with the embodiments.

In order to describe a method for analyzing filling for a karst reservoir based on spectrum decomposition and machine learning of the present invention more clearly, all steps in the embodiments of the present invention are described in details hereinafter through combination with FIG. 1.

The method for analyzing filling for the karst reservoir based on spectrum decomposition and machine learning in a first embodiment of the present invention comprises Step S100-Step S1000, and all the steps are described in details as follows:

The statistical analysis on actual seismic data indicates that the characteristics of the seismic waveforms, which are generated by a paleokarst cave, are usually composed of multiple groups of valleys and peaks. Through researching, it was found that the characteristic reflection was caused by the interference of the seismic wave; and in addition, the amplitude of the reflected wave was related to the combination of fillings of the cave (Yu et al., 2018). Xu et al. (2016) also found that various seismic waveform reflection characteristics were generated by different shapes, thicknesses and combination relationships of paleokarst cave-type target bodies through simulation of a physical model, namely, the characteristics of the reflection morphology were related to the diameter of the cave, the morphology of the cave and the distribution law (Xu et al., 2016). Scholars have further found that in a same phase belt of an isochronous stratigraphic framework, the similarity of the waveform characteristics can represent lithological combination with the certain correlation. Therefore, the isochronous interface partition inversion and the simulation for the characteristic parameters are carried out based on the idea of indication of the waveforms, lateral change information of the seismic waveforms is utilized, and the constraint for a sedimentary environment is better reflected, so as to be more aligned with the sedimentary geology law.

Figure 2:
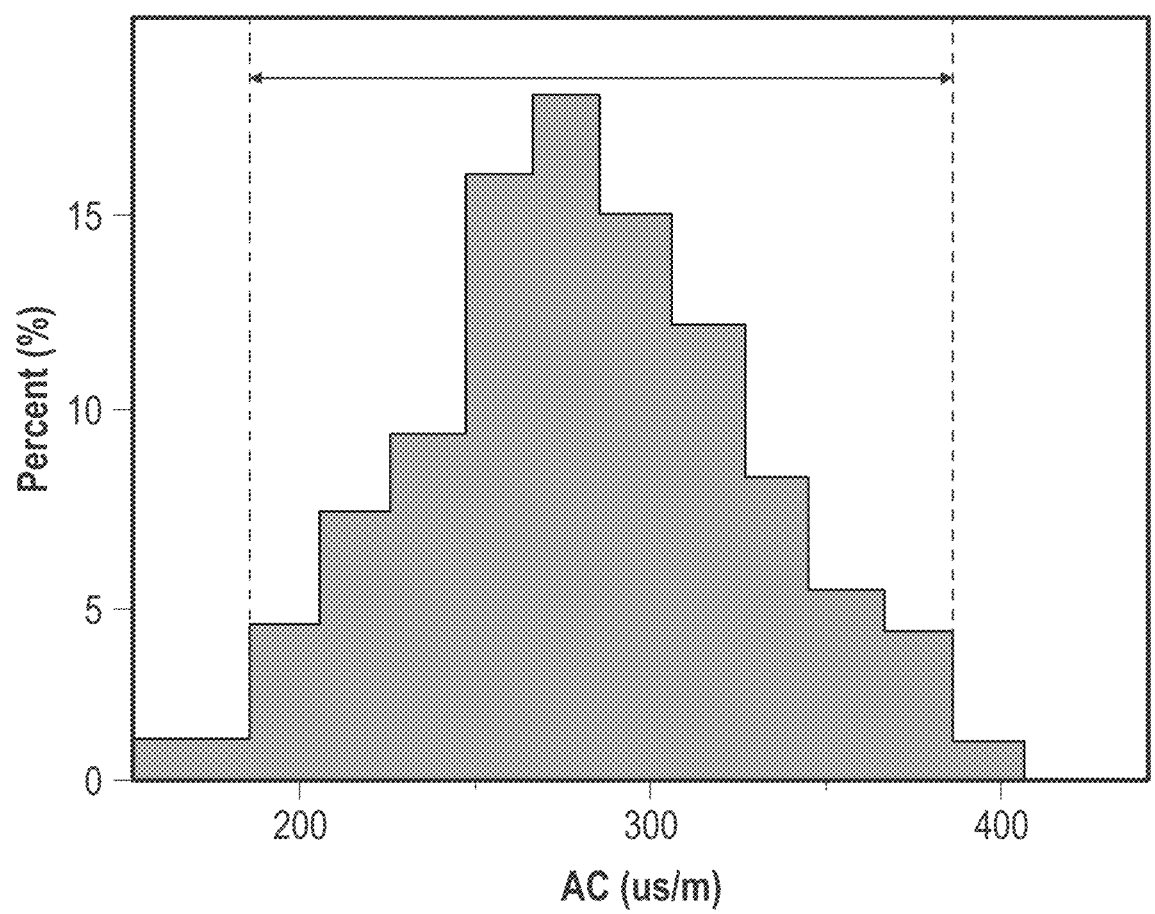
FIG. 2 is a schematic diagram of a logging curve with outliers removed of the present invention.
Figure 3:
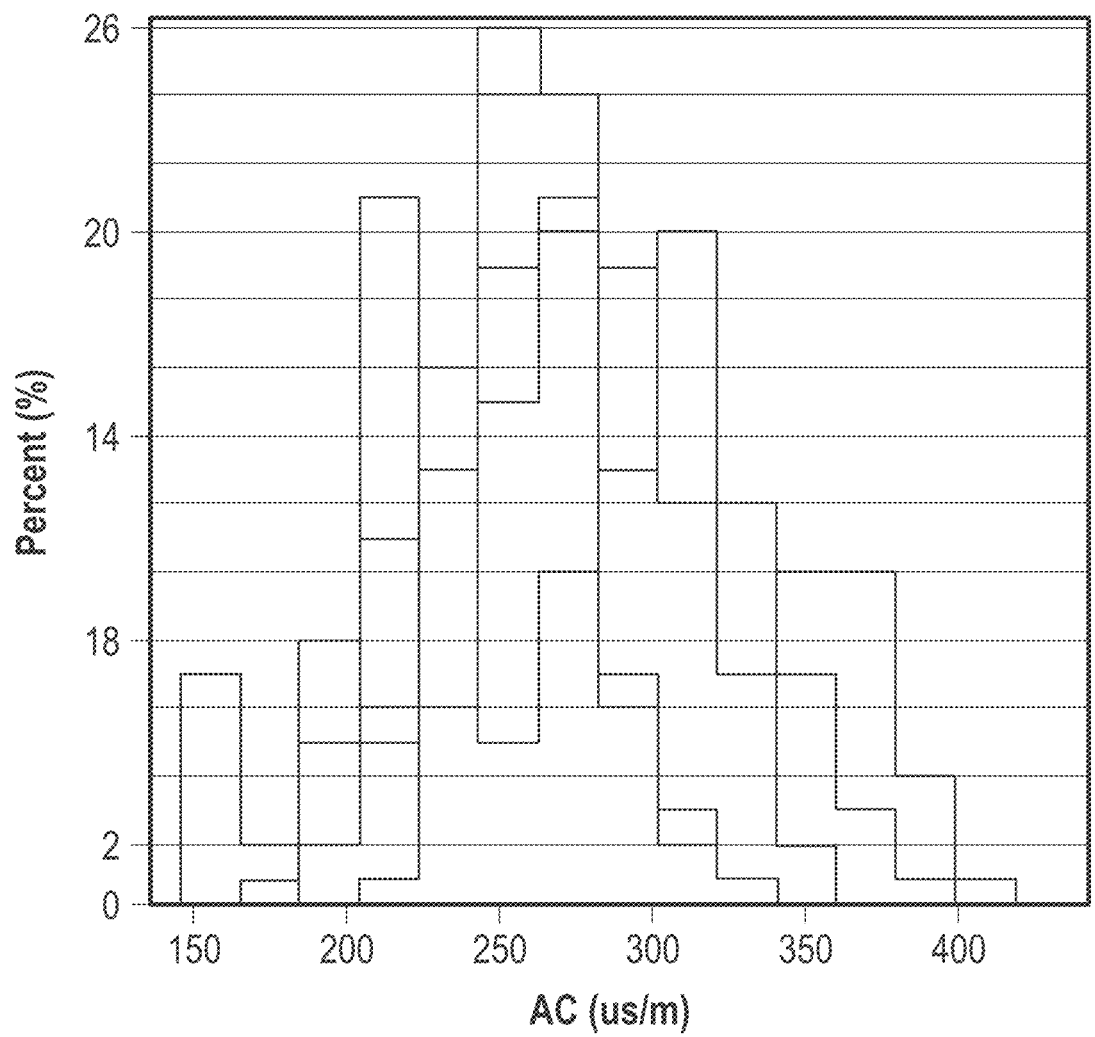
FIG. 3 is a schematic diagram of superposing all curves in the standardization flow of the present invention.

Step S100, acquiring original geophysical logging data: acquiring original logging data of each sample well by logging equipment, comprising: measuring the self-potential SP of each sample well by a measuring electrode, measuring the natural gamma ray GR of each sample well by a natural gamma ray downhole device and a natural gamma ray ground instrument, and acquiring the caliper CAL of each sample well by a caliper arm; and acquiring data of a resistivity curve: deep lateral logging RLLD, shallow lateral logging RLLS and micro-lateral logging RLLM, and data of a physical property characterization curve: compensated neutrons CNL, a compensated acoustic curve AC and a density curve DEN by traditional logging equipment; and acquiring definite lithological information and physical information of an individual depth segment based on imaging logging information, drilling information, mud logging information and rock-core information, so as to determine depth data of a marker bed at a target horizon, wherein in the embodiment, data of nine conventional logging curves in the depth range of 5,500-5,750 m is detected at a borehole in a work area, and the sampling interval is set as 0.01 m; 3D seismic data of the work area with the area of about 27 km2 is obtained by utilizing a 3D seismic detection method and by virtue of a seismic wave excitation source and a seismic signal detector; the two-way travel time of a signal record is 4 s; the time interval of sampling points is 1 ms; and the detection depth is more than 6,000 m; in the embodiment, the step of measuring the self-potential SP of each sample well by the measuring electrode and measuring the natural gamma ray GR of each sample well by the natural gamma ray downhole device and the natural gamma ray ground instrument specifically comprises:

measuring the self-potential SP of each sample well by the measuring electrode:

arranging a measuring electrode N on the ground and arranging a measuring electrode M under the well by a cable;

lifting the measuring electrode M along the well axis to measure the change of the self-potential with the well depth, wherein a calculation method of the value of the self-potential is shown as follows:

$$E_A = E_d - E_{da} = (K_d - K_{da})lg\frac{R_{mf}}{R_w} = \frac{R_{mf}}{R_W},$$

wherein $E_A$ represents the total self-potential; $K_d$ represents the coefficient of diffusion potential; $K_{da}$ represents the coefficient of diffusion and adsorption potential; $R_{mf}$ represents the value of resistivity of mud filtrate; and $R_W$ represents the value of resistivity of stratum water; and measuring the natural gamma ray GR of each sample well by the natural gamma ray downhole device and the natural gamma ray ground instrument:

wherein the natural gamma ray downhole device comprises a detector, an amplifier and a high-voltage power supply;

acquiring the natural gamma ray by the detector, transforming the natural gamma ray into an electric pulse signal and amplifying the electric pulse signal by the amplifier; and transforming the number of electric pulses formed in each minute into the potential difference and recording the potential difference by the ground instrument;

a dual lateral electrode system is composed of a main electrode, supervision electrodes, ring shielding electrodes and cylindrical electrodes; the main electrode $A_0$ is located in the center, the supervision electrodes $M_1$ and $M_1$', the supervision electrodes $M_2$ and $M_2$' and the ring shielding electrodes $A_1$ and $A_1$' are distributed symmetrically up and down, and the two cylindrical electrodes are additionally arranged at the symmetrical positions of the outer side of the ring shielding electrodes $A_1$ and $A_1$'; two cylindrical electrodes in a deep lateral electrode system are shielding electrodes $A_2$ and $A_2$', and two cylindrical electrodes in a shallow lateral electrode system are loop electrodes $B_1$ and $B_2$; a comparison electrode N and a loop electrode B of the deep lateral electrode system are installed at the positions far away from the electrode systems; a main electrode $A_0$ of a micro-spherical focusing electrode system is a rectangular sheet electrode; rectangular frame electrodes sequentially arranged outwards are a measuring electrode $M_0$, the auxiliary electrode $A_1$ and the supervision electrodes $M_1$ and $M_2$; the loop electrode B is installed on a shell of an instrument or on a supporting frame of an electrode plate; the change of the potential difference between any supervision electrode and the comparison electrode is measured, namely, the change of the resistivity of a medium is reflected; and the expression of the apparent resistivity is shown as follows:

$$R_a = K\frac{U_{M_1}}{I_0};$$

wherein in the expression, K represents the coefficient of the electrode system, and the coefficients of the electrode systems of deep lateral logging, shallow lateral logging and micro-spherical focusing logging are different; $U_{M_1}$ represents the potential of a supervision electrode M; and $I_0$ represents main current;

the vibration of mass points of a surrounding medium is caused by the vibration of a crystal of a transmitting transducer of a downhole instrument, so as to generate the acoustic wave transmitted to mud and rock strata in the well; receiving transducers R and R2 can be used for receiving the slide wave one after another in the well, and the time difference Δt is recorded, so as to measure the velocity of the acoustic wave of a stratum; for example, an emitter is configured to emit the acoustic wave at a certain moment $t_0$, the acoustic wave is transmitted to a receiver through the mud, the stratum and the mud, and the transmission path thereof is shown in the figure, namely, the acoustic wave is transmitted to a receiving transducer $R_1$ along the path of ABCE, and the acoustic wave is transmitted to the receiving transducer $R_2$ along the path of ABCDF; and the moments that the acoustic wave arrives at the receiving transducer $R_1$ and the receiving transducer $R_2$ are respectively $t_1$ and $t_2$, so the time difference Δt that the acoustic wave arrives at the two receiving transducers is calculated by the following formula:

$$\Delta t = \frac{CD}{v_2} - \frac{CE}{v_1},$$

wherein in the formula, $v_1$ represents the sound velocity of the mud, and $v_2$ represents the sound velocity of the stratum;

a density logging instrument comprises a gamma ray source and two detectors for receiving gamma rays, i.e. a long spacing detector and a short spacing detector; the two detectors are installed on a sliding plate and are pushed onto the wall of the well when in logging; an auxiliary electronic circuit is arranged above the downhole instrument; usually, 137Cs is taken as the gamma ray source, the gamma rays emitted by the gamma ray source have medium energy (0.661 MeV), and only Compton scattering and the photoelectric effect can be generated when the gamma rays are used for irradiating a substance; as the density of the stratum is different, the scattering and absorption capacities of gamma-ray photons are different, and the counting rate of the gamma-ray photons received by the detectors is also different; and the counting rate N of the gamma-ray photons with the passing distance of L is known:

$$N = N_0 e^{-\mu L};$$

if only Compton scattering exists, μ represents the Compton scattering absorption coefficient, and the following formula is obtained by transformation:

$$N = N_0 \cdot e^{-C\rho_b \cdot L},$$

wherein in the formula, C represents the constant related to the stratum, and L represents the distance from a receiving source to the gamma ray source;

after the spacing is selected, scales are calibrated for the instrument, and the relationship between $\rho_b$ and N is found, so that the density $\rho_b$ of the stratum can be measured by recording the counting rate N of the scattered gamma-ray photons;

compensated neutron logging is composed of a neutron emission source and two receiving detectors; two counting rates $N_t(r_1)$ and $N_t(r_2)$ are obtained by the counting of the two detectors; and the hydrogen content of the stratum can be reflected by the specific value of the two counting rates:

$$\frac{N_t(r_1)}{N_t(r_2)} = \frac{r_2}{r_1} e^{-(r_1 - r_2)/L_S}$$

wherein in the formula, $r_1$ and $r_2$ represent the distance from the two detectors to a neutron source, and $L_s$ represents the slowing-down length, which reflects the hydrogen content of the stratum; and when the caliper is measured, the instrument is moved downwards to the expected depth in the well; the caliper arm is opened by a traditional manner, and then four caliper legs are unfolded outwards under the action of spring force, wherein the included angle between every two of the caliper legs is 90 degree; the tail ends of the four caliper legs cling to the wall of the well; with upward moving of the instrument, the caliper arm is unfolded or retracted with the change of the caliper and can drive a connecting rod to move up and down; the connecting rod is connected with a sliding end of a potentiometer, and then the change of the caliper can be transformed into the change of the resistance; when current with certain intensity is applied on a movable resistor, the potential difference between a certain fixed end of the movable resistor and the sliding end is changed with the change of resistance value between the certain fixed end and the sliding end; and the size of the caliper is reflected by measuring the potential difference:

$$d = d_0 + c \frac{\Delta U_{MN}}{I}$$

wherein in the formula, $\Delta U_{MN}$ represents the potential difference of a caliper measuring instrument, $d_0$ represents the initial value, and c represents the constant of the instrument;

Step S200, acquiring seismic data: acquiring data of an original seismic wave reflected signal by a seismic wave excitation device and a receiving device and acquiring isochronous 3D distribution of the marker bed at the target horizon according to the waveform of the data of the original seismic wave reflected signal;

Step S300, preprocessing original geophysical logging data: drawing data of logging curves based on original logging data of the sample wells and carrying out abnormal value processing and standardization processing, so as to obtain data of standardized logging curves, wherein in the embodiment, Step S300 comprises:

Step S310, drawing data of an original logging curve based on the original logging data;

Step S320, removing outliers to obtain data of the logging curve with the outliers removed based on the data of the original logging curve, wherein the outliers refer to the unreasonable values existing in a data set; a histogram of parameters of the single curve in all logging data is counted; the interval threshold is reserved by reasonable adjustment to remove the outliers; and a histogram of the logging curve with the outliers removed is shown in FIG. 2; and Step S330, superposing all data of the histogram of the single logging curve at the positions of the sample wells in the work area based on the data of the logging curve with the outliers removed, and integrating the thresholds to obtain the data of the standardized logging curve; and obtaining the data of the standardized logging curve by taking the standardization processing for the compensated acoustic curve AC as an example, wherein due to the difference of the instrument or the influence of other factors, the conventional logging data between different wells is too large or too small on the whole, the curves need to be standardized, and all the curves are superposed, which is shown in FIG. 3;

Step S400, preprocessing the seismic data: obtaining a high-precision 3D seismic amplitude data body by mixed-phase wavelet estimation and maximum posteriori deconvolution and enhancing diffusion filtering based on the data of the seismic wave reflected signal, wherein at present, the 3D seismic network measuring technology with the track pitch of 25 m×25 m is widely applied to the petroleum exploration field, the seismic wave reflected signal is received in the vertical direction at the sampling interval of 2 ms usually, and the total sampling time is within 6 s, so as to detect the geological characteristics of intervals with different depths; the method of the present invention is usually used for detecting a target body with the depth of over 2 m, and the requirement on the dominant frequency of the seismic data is higher, which is within the range of 50-60 Hz; and when the dominant frequency of an amplitude data body of the seismic data in the development interval of the paleokarst cave is lower than 50 Hz, by adopting mixed-phase wavelet estimation and maximum posteriori deconvolution and enhancing diffusion filtering, frequency broadening and noise reduction processing is carried out on the 3D seismic data, so as to obtain a 3D seismic data body with high resolution and high signal-to-noise ratio;

the mixed-phase wavelet estimation and maximum posteriori deconvolution is a data processing method which is used for improving the resolution of the seismic signal by broadening the effective frequency band on the premise of ensuring the seismic data after being processed is higher in fidelity, which is equivalent to Step S410-Step S4100 in the embodiment;

in the embodiment, Step S400 specifically comprises:

Step S410, based on the data of the seismic wave reflected signal, expressing a frequency domain seismic record convolution model as:

$$s(\omega)=\sigma(\omega)\varepsilon(\omega),$$

wherein s(ω) represents the seismic record after Fourier transformation; σ(ω) represents the wavelet after Fourier transformation; ε(ω) represents the frequency spectrum of the reflection coefficient after Fourier transformation; and ω represents the angular frequency;

Step S420, transforming logarithms on the two sides of the equation of the frequency domain seismic record convolution model into a linear system to obtain a linear seismic record convolution model:

$$\ln s(\omega)=\ln \sigma(\omega)+\ln \varepsilon(\omega)$$

Figure 4:
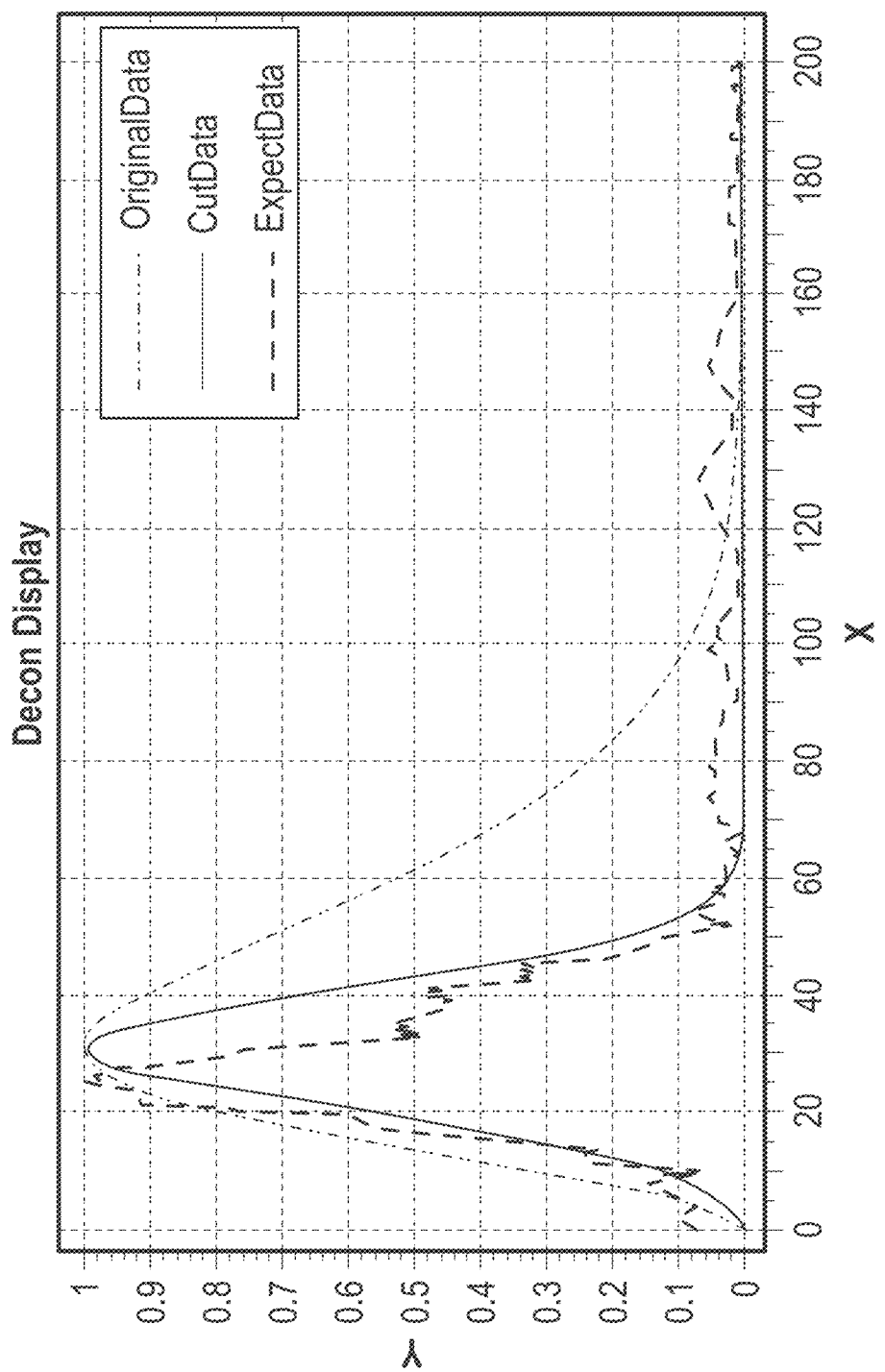
FIG. 4 is a diagram of the wavelet amplitude spectrum of the embodiment of the present invention.
Figure 5:
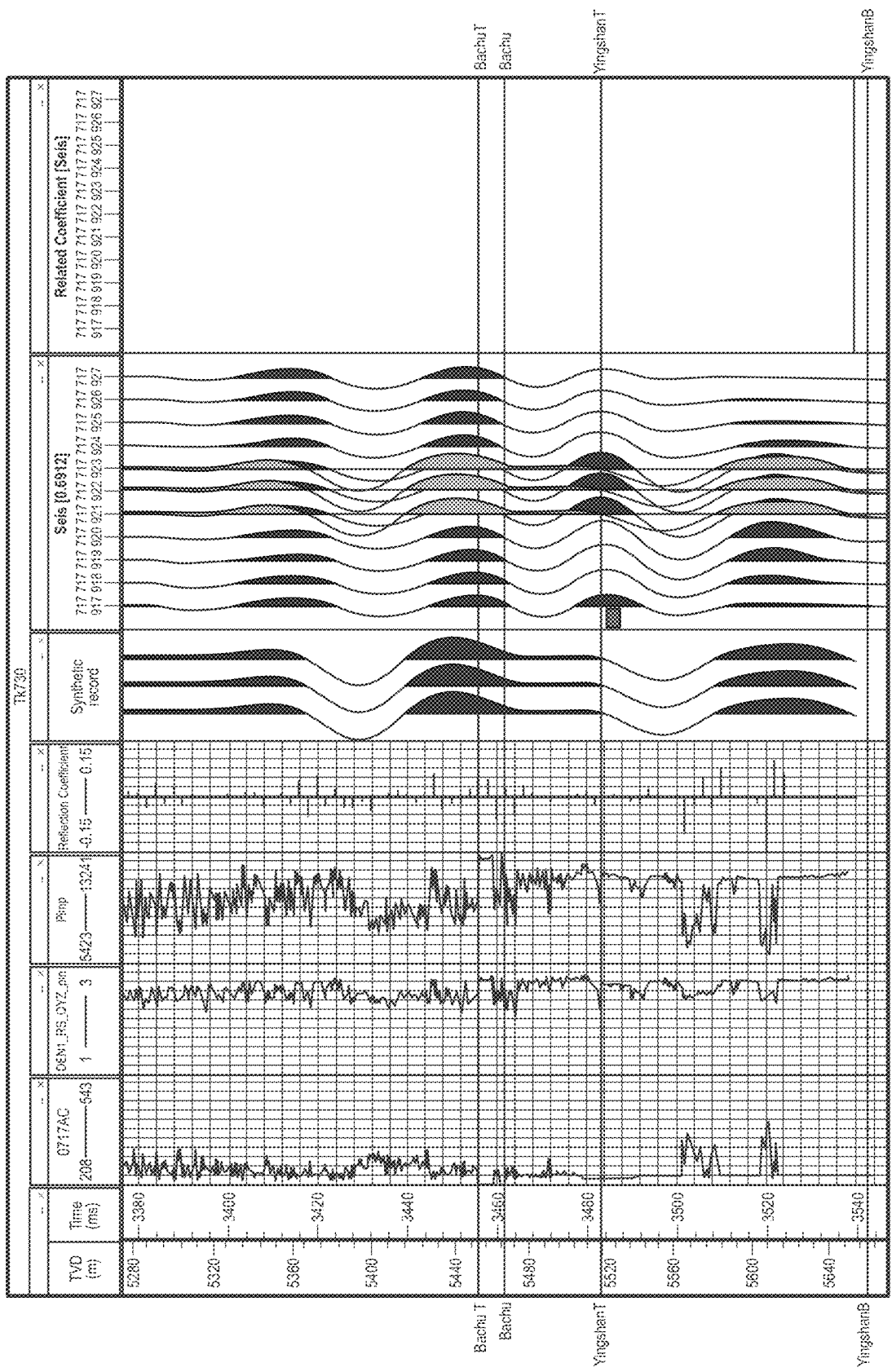
FIG. 5 is a diagram of well-to-seismic calibration for a single well in the embodiment of the present invention.
Figure 6:
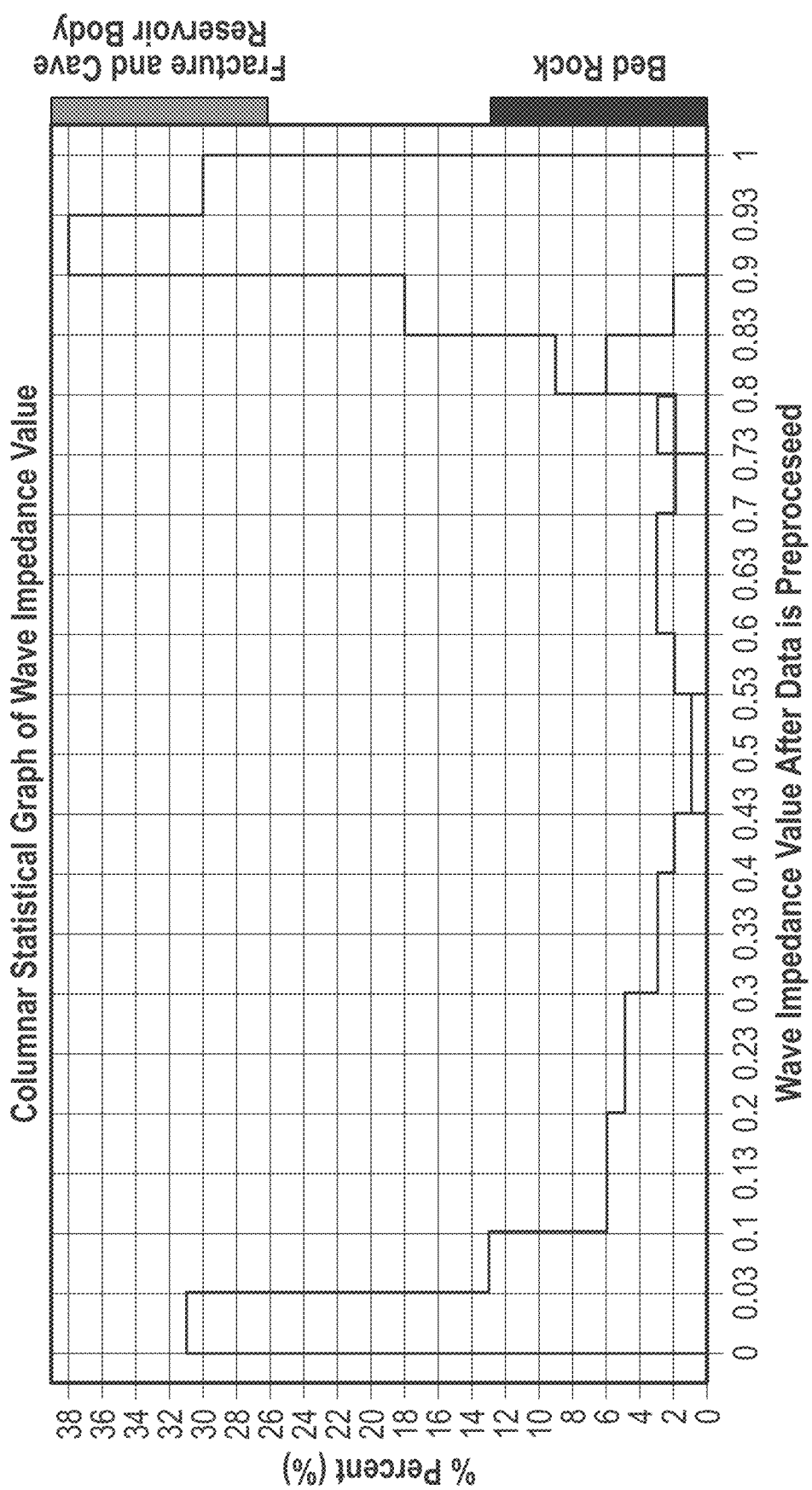
FIG. 6 is a columnar statistical diagram of wave impedance curves in the embodiment of the present invention.
Figure 7:
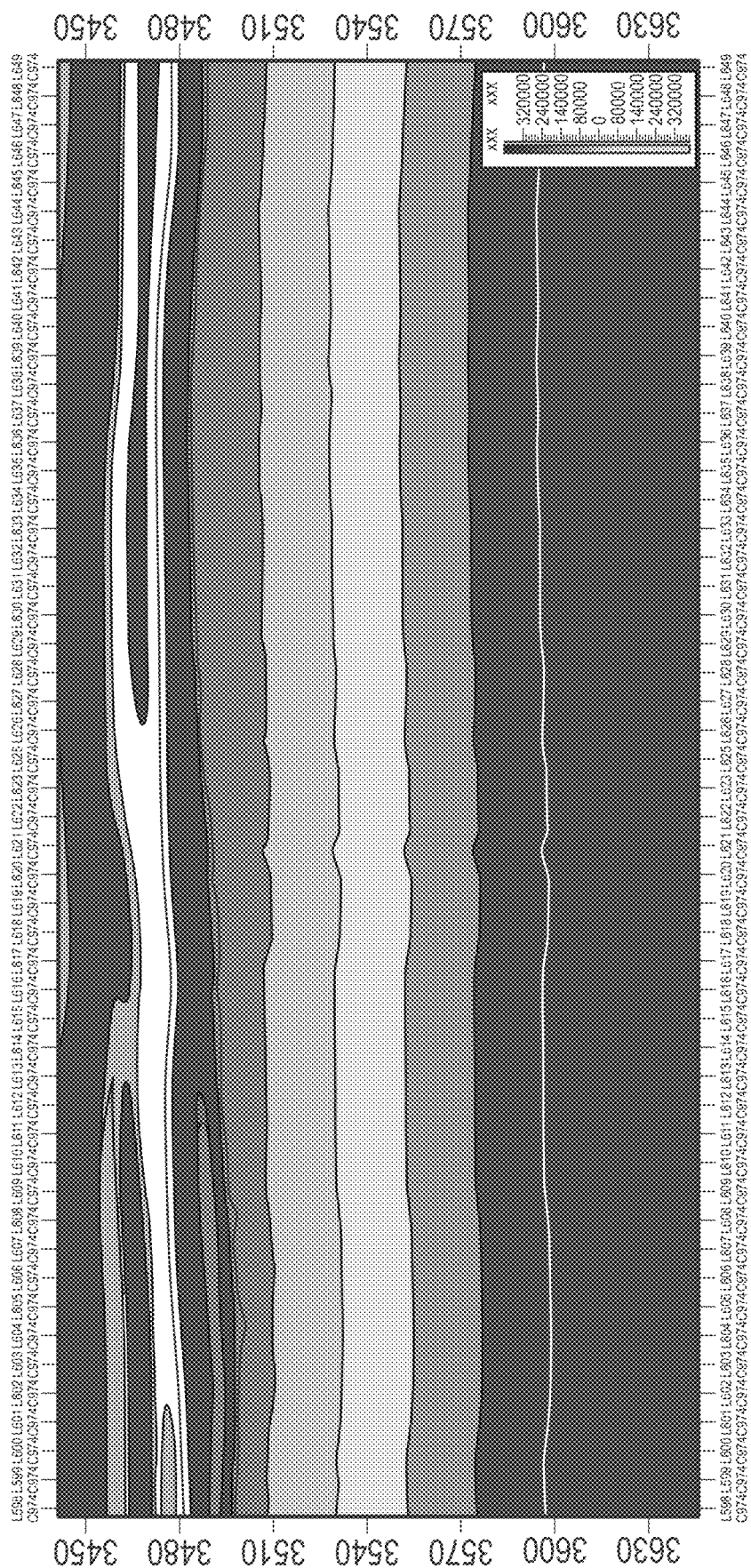
FIG. 7 is a diagram of an isochronous framework model under a T74 marker bed in the embodiment of the present invention.
Figure 8:
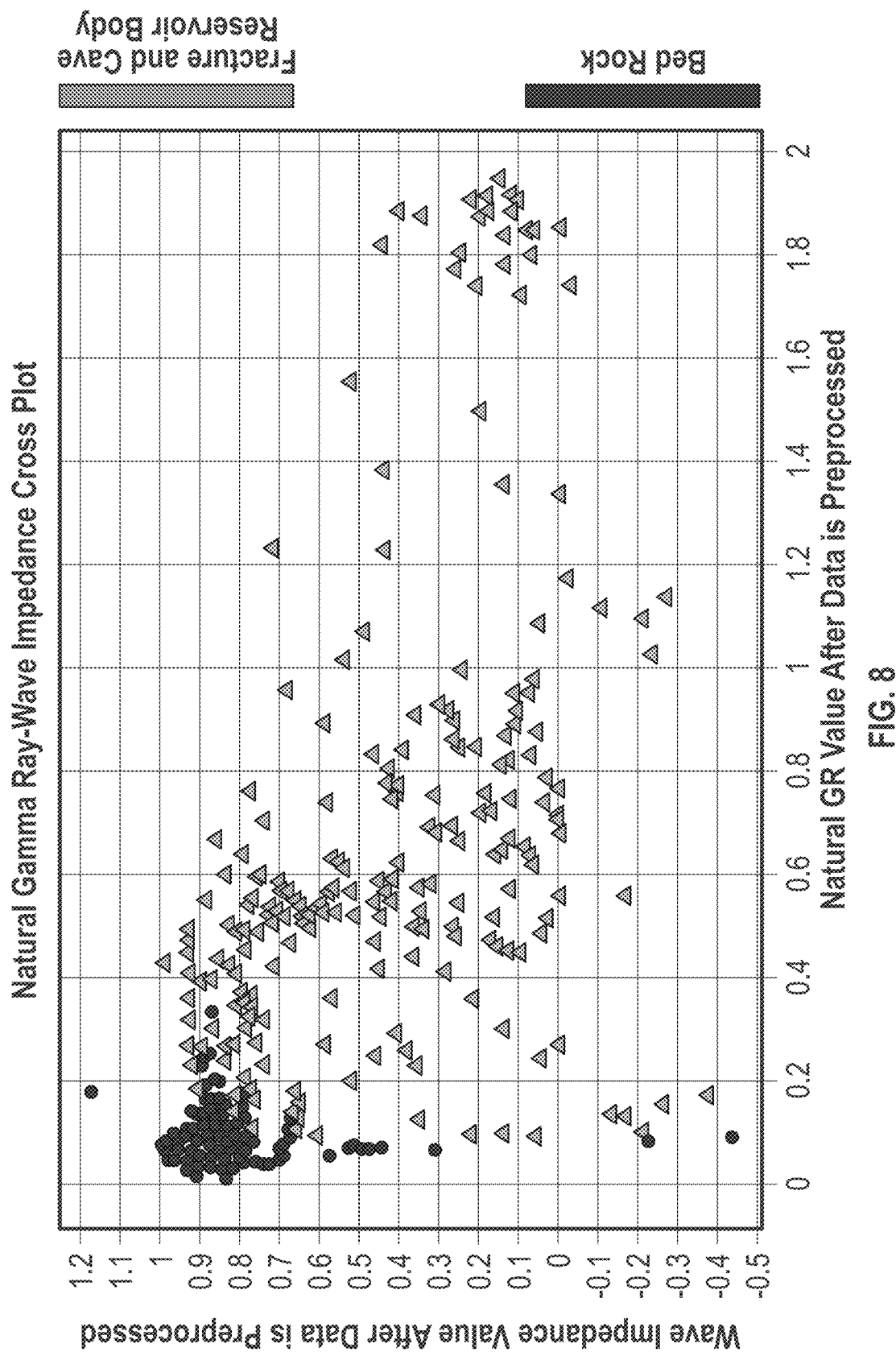
FIG. 8 is a diagram of box selection for a semi-filled sample of a paleokarst cave type reservoir in the embodiment of the present invention.
Figure 10:
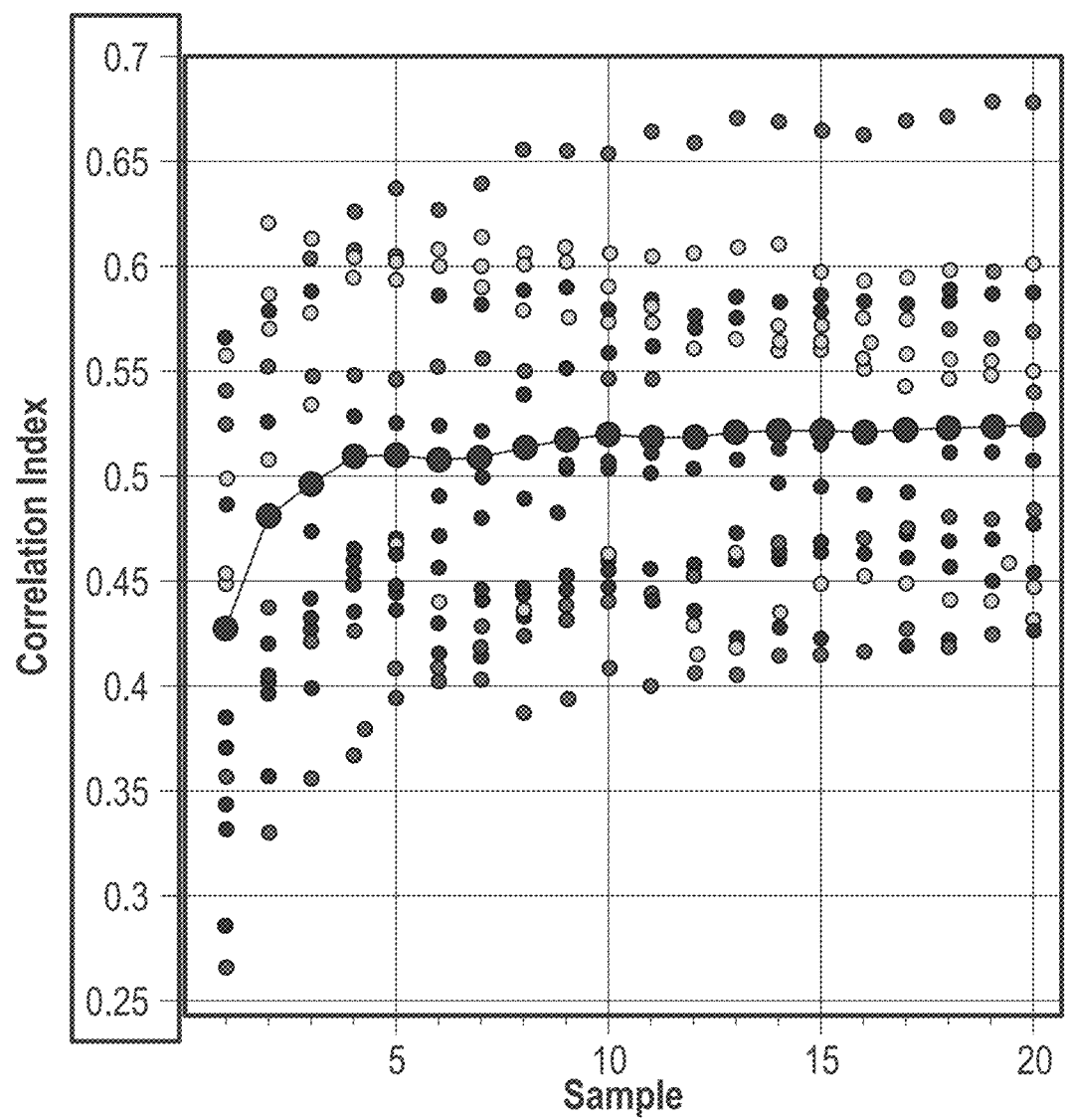
FIG. 10 is a schematic diagram of fitting all correlation curves with the correlation of the characteristic parameters of reference wells changing with the parameter of the sample number into an overall correlation curve.

Step S430, carrying out inverse Fourier transformation on the linear seismic record convolution model to obtain a complex cepstrum sequence:

$$\tilde{s}(t)=\tilde{\sigma}(t)+\tilde{\varepsilon}(t),$$

wherein $\tilde{s}(t)$ represents a complex cepstrum sequence of seismic waveform record; $\tilde{\sigma}(t)$ represents a complex cepstrum sequence of the seismic wavelet; $\tilde{\varepsilon}(t)$ represents a complex cepstrum sequence of the stratum reflection coefficient; and t represents the time of the seismic waveform record;

Step S440, based on the complex cepstrum sequence, separating the wavelet and the reflection coefficient by a low-pass filter and extracting a wavelet amplitude spectrum, wherein the difference between the smoothness of the wavelet and the reflection coefficient sequence is easily distinguished in the complex cepstrum: the energy of the wavelet appears near the original point, while the reflection coefficient sequence is far away from the original point; and the wavelet and the reflection coefficient in the complex cepstrum can be separated from each other by the low-pass filter, so as to achieve the purpose of extracting the wavelet amplitude spectrum;

Step S450, acquiring a simulated seismic wavelet amplitude spectrum by a least square method:

$$\sigma(f)=A(f)f^{\alpha}e^{H(f)},$$

wherein the fitting parameter α≥0 of the least square method is a constant; σ(f) represents the wavelet amplitude spectrum; H(f) and A(f) represent the polynomials off; and f represents the frequency of the seismic wavelet; and in the embodiment, a calculation method of the simulated seismic wavelet amplitude spectrum comprises:

positioning the maximum value of an amplitude spectrum in the data of the seismic wave reflected signal and the frequency corresponding to the maximum value;

fitting the maximum value of the amplitude spectrum of the seismic signal and the simulated seismic wavelet amplitude spectrum by the least square method to obtain the coefficients of the polynomials of the parameters α and H(f), so as to obtain the fit amplitude value of the corresponding frequency of the maximum value; and dividing the fit amplitude value of the corresponding frequency by the maximum value of the amplitude spectrum of the seismic signal, so as to fit the coefficient of the polynomial A(f) by the quotient;

Step S460, based on the simulated seismic wavelet amplitude spectrum, obtaining the maximum phase component and the minimum phase component of the wavelet, wherein it is assumed that the maximum phase component of the wavelet σ(t) is u(t), and the minimum phase component of the wavelet σ(t) is v(t), the wavelet σ(t) is:

$$\sigma(t)=u(t)\cdot v(t);$$

and the complex cepstrum of the amplitude spectrum is expressed as follows:

$$2\tilde{\sigma_0}(t)=\tilde{u}(t)+\tilde{v}(t)+\tilde{u}(-t)+\tilde{v}(-t)$$

wherein the complex cepstrum $\tilde{\sigma_0}(t)$ of the amplitude spectrum is displayed symmetrically on the positive axis and the negative axis of the complex cepstrum; $\tilde{v}(-t)$ represents the complex cepstrum of the minimum phase function corresponding to the maximum phase component v(t) of the seismic wavelet; and $\tilde{u}(-t)$ represents the complex cepstrum of the maximum phase function corresponding to the minimum phase component u(t) of the seismic wavelet;

Step S470, based on the complex cepstrum in the amplitude spectrum, determining a group of mixed-phase wavelet sets with the same amplitude spectrum; constantly adjusting the parameters of the Yu wavelet; keeping the low frequency, broadening the high frequency and properly increasing the dominant frequency to construct the expected output wavelet form; and looking for the best balance point for improving the resolution ratio and the fidelity with reference to a signal-to-noise ratio spectrum under the control of the logging curves, so as to obtain data of the waveform after shaping, wherein the wavelet amplitude spectrum is shown in FIG. 4;

after mixed-phase wavelet estimation and maximum posteriori deconvolution, the effective frequency band of the seismic data is broadened, and the high-frequency part is reasonably strengthened; in the aspect of the seismic waveforms, the number of in-phase axes is increased, so that the detailed changes of seismic wave reflection information are reflected easily, and the consistency of the waveform of the same reflection wave group is improved in the aspects of the amplitude, the phase and the frequency; and in the aspect of the seismic response of the paleokarst cave, the 'bead-like' reflection characteristic is particularly obvious, and the details of the internal morphology of strings of beads can be clearly displayed, which represents the seismic reflection of a complex paleokarst cave type reservoir with different structure characteristics and combinations of the fillings, so as be helpful to the fine geological interpretation in the later period;

the diffusion filtering technology was firstly applied to the processing and interpretation for the seismic data by Fhemers and Hocker in 2003; according to the technology, the noise can be effectively suppressed, and the details such as edges, faults, unconformable surfaces, pinch out and the like of a geological body in the seismic data can be reserved as much as possible, so as to provide the reliable seismic data for subsequent seismic interpretation and reservoir prediction and greatly improve the success rate of exploration and development of oil and gas; and in order to achieve the purposes of reducing the seismic noise and enhancing the diffusion filtering effect of the geological structure characteristics, a step of looking for the diffusion tensor is the most critical step of the method:

Step S480, based on the data of the waveform after shaping, constructing a tensor diffusion model:

$$\begin{cases} \frac{\partial U}{\partial \tau} = div(D \cdot \nabla U) \\ U|_{\tau=0} = U_0 \end{cases}$$

wherein $\tau$ represents the diffusion time; div represents the divergence operator; D represents the tensor type diffusion coefficient of a diffusion filter; U represents the diffusion filtering result; $U|_{\tau=0}$ represents the diffusion filtering result when $\tau=0$; $U_0$ represents the data of the waveform after shaping when $\tau=0$; and as the initial condition of the tensor diffusion model, $\nabla U$ represents the gradient of the diffusion filtering result;

based on the tensor diffusion model, constructing the gradient structure tensor:

$$J_\rho(\nabla U) = G_\rho * J_0 = G_\rho * (\nabla U (\nabla U)^T)$$

wherein U represents the diffusion filtering result, and $J_0$ represents the tensor product of the gradient vector;

the Gaussian function with the scale of $\rho$ is expressed by $G_\rho$:

$$G_\rho(r) = (2\pi\rho^2)^{-3/2} \exp(-|r|^2/(2\rho^2))$$

wherein r represents the calculation radius;

the characteristic vector of the structure tensor is:

$$J_\rho(\nabla U) = (v_1 \ v_2 \ v_3) \begin{pmatrix} \lambda_1 & 0 & 0 \\ 0 & \lambda_2 & 0 \\ 0 & 0 & \lambda_3 \end{pmatrix} (v_1 \ v_2 \ v_3)^T$$

wherein $v_1$, $v_2$ and $v_3$ represent three characteristic vectors of the gradient structure tensor and can be regarded as a local orthogonal coordinate system; $v_1$ points to the gradient direction of the seismic signal; a plane formed by $v_2$ and $v_3$ is in parallel to the local structure characteristics of the seismic signal; and $\lambda_1$, $\lambda_2$ and $\lambda_3$ represent three characteristic values corresponding to $v_1$, $v_2$ and $v_3$ respectively;

Step S490, based on the characteristic vector of the structure tensor, respectively calculating the confidence degree of a linear structure, the confidence degree of a face structure and the diffusion tensor, wherein the confidence degree $C_{line}$ of the linear structure is:

$$C_{line} = \frac{\lambda_2 - \lambda_3}{\lambda_2 + \lambda_3}$$

the confidence degree $C_{plane}$ of the face structure is:

$$C_{plane} = \frac{\lambda_1 - \lambda_2}{\lambda_1 + \lambda_2}$$

and the diffusion tensor D is:

$$D = (v_1 \ v_2 \ v_3) \begin{pmatrix} \mu_1 & 0 & 0 \\ 0 & \mu_2 & 0 \\ 0 & 0 & \mu_3 \end{pmatrix} (v_1 \ v_2 \ v_3)^T = \begin{pmatrix} D_{11} & D_{12} & D_{13} \\ D_{21} & D_{22} & D_{23} \\ D_{31} & D_{32} & D_{33} \end{pmatrix}$$

wherein $\mu_1$, $\mu_2$ and $\mu_3$ represent three non-negative characteristic values of the diffusion tensor and respectively represent the intensity of filtering of the diffusion filter in the three characteristic directions $v_1$, $v_2$ and $v_3$; and Step S4100, repeating the steps S480-S490 until the preset number of iterations is achieved, so as to obtain the diffusion filtering result, i.e. the high-precision 3D seismic amplitude data body, wherein a diffusion filtering algorithm is adopted for reserving the geological characteristics of the paleokarst cave type reservoir of 'bead-like' reflection, and the imaging capability of the seismic data for the target geological body is enhanced; and meanwhile, the effects of suppressing the noise and improving the transverse continuity of the in-phase axes and the signal-to-noise ratio of the seismic signal;

Step S500, carrying out well-to-seismic calibration and selecting characteristic parameters: acquiring a wave impedance curve of each sample well based on the compensated acoustic curve AC and the density curve DEN in the data of the standardized logging curve, so as to calculate a reflection coefficient curve; acquiring the preferred frequency of the ricker wavelet, so that the preferred frequency is consistent with the dominant frequency of the high-precision 3D seismic amplitude data body; carrying out convolution operation on the ricker wavelet and the reflection coefficient curve, so as to obtain a synthetic seismic record; comparing the depth data of the marker bed at the target horizon and the isochronous 3D distribution of the marker bed at the target horizon for well-to-seismic calibration; calculating the correlation between the synthetic seismic record and the waveform of a near-well seismic channel; when the correlation is more than or equal to a preset first threshold, judging that the result of well-to-seismic calibration is qualified, so as to obtain the time-depth transforming relationship between the data of the logging curve and the seismic record and the characteristic parameters sensitive to the reservoir; and the first threshold is preferably 85%;

wherein a method for obtaining the characteristic parameters sensitive to the reservoir comprises:

drawing a columnar statistical graph of responses of logging parameters, which are generated to different geological bodies near the wells; when the numerical value of data of a certain standardized logging curve can be used for distinguishing data points that are more than a second threshold preset by different logging interpretation conclusions, selecting the data of the standardized logging curve as the characteristic parameters sensitive to the reservoir, wherein the characteristic parameters sensitive to the reservoir at least comprise the wave impedance IMP and can also comprise one or more of the caliper CAL, the natural gamma ray GR, the self-potential SP, the data of the resistivity curve: the deep lateral logging RLLD, the shallow lateral logging RLLS and the micro-lateral logging RLLM, and the data of the physical property characterization curve: the compensated neutrons CNL, the compensated acoustic curve AC and the density curve DEN; and preferably, the second threshold is 70%;

when a carbonate paleokarst cave type reservoir is looked for, a small karst cave reservoir body with the height of 0.5-5.0 m has the characteristics of wide distribution and large number, which is taken as a key object of reservoir prediction; the characteristics of the wave impedance of seismic reflection and inversion only have a certain response to the reservoir with the depth of above 5 m and cannot be identified with certainty; meanwhile, although conventional logging is characterized by low resistance, low density, increased neutrons and time difference of the acoustic wave, the detection range thereof is limited; and by the well-to-seismic calibration technology, the logging curves are regarded as 'hard data', the 3D seismic waveforms are regarded as 'soft data', and the logging constraint is established for the interpretation for the seismic data of the large-scale reservoir, so that the identification precision of such the reservoir can be greatly improved;

firstly, the logging data and the seismic data are integrated through well-to-seismic calibration, the wave impedance curve is calculated according to the compensated acoustic curve AC and the density curve DEN, and then a reflection coefficient curve is calculated; the ricker wavelet is constructed according to the seismic dominant frequency of an interval of interest; the seismic record is synthesized; the synthetic record is compared with the near-well seismic channel from the two aspects of the position of the marker bed and the in-phase axes of seismic reflection; and the time-depth transforming relationship is finally obtained by quality control for the related coefficient between the synthetic record and the near-well seismic channel;

in the embodiment, the synthetic seismic record is obtained by using the 25 Hz (the dominant frequency of the seismic data of the target interval) of ricker wavelet according to wave impedance information calculated by the compensated acoustic curve and the density curve;

a marker bed at the top boundary of an eagle mountain group is determined by observing seismic waveform data; compared with a mudstone bed of an overlying Bachu group, the reflection of the waveforms at a screen area in carbonate rocks is irregular and has uncertain direction, the amplitude can be strong or weak, and in-phase axes can be long or short and are poor in continuity; and the phenomena of termination and bifurcation of reflection of the non-systematic in-phase axes exist;

in the embodiment, the time-depth transforming relationship between the data of the logging curve and the seismic record is:

$$T = T_{H_0} + 2\Sigma_{i=1}^n T_i \cdot \Delta H,$$

wherein $T_{H_0}$ represents the time of the seismic signal corresponding to the initial depth of acoustic logging; $T_i$ represents the time difference of the acoustic wave; $\Delta H$ represents the sampling interval of the data of the logging curve; and T represents the two-way travel time of the seismic wave;

a diagram of well-to-seismic calibration for a single well is shown in FIG. 5; and the position of the paleokarst cave of the interval of interest is determined according to drilling data, mud logging data and rock-core data, and the paleokarst cave is divided into a fully filled reservoir, a semi-filled reservoir and a bed rock reservoir according to the filling degree; the type of the reservoir is divided into a sedimentation filled reservoir, a collapse filled reservoir, a chemically filled reservoir and a mixed filled reservoir according to the relationship between the lithology and the combination of the fillings; the parameters of the logging curves sensitive to the type of the reservoir are divided preferably by applying the statistical manners of the histogram and a cross plot of the logging curves; for example, the wave impedance curves can reflect the difference of the physical properties of a rock and can be used for distinguishing the paleokarst cave and a surrounding rock; a plate of a wave impedance-natural gamma ray cross plot can not only be used for effectively distinguishing the fully filled reservoir and the semi-filled reservoir, but also be used for dividing the type of the fillings of the reservoir by utilizing the lithological and physical characteristics of the geological bodies; and a columnar statistical diagram of the wave impedance curves is shown in FIG. 6, and the response characteristics of the filling degree of the wave impedance-natural gamma ray GR cross plot are shown in FIG. 8;

Step S600, constructing an isochronous framework model: constructing the isochronous framework model based on the law of sedimentary strata reflected by the high-precision 3D seismic amplitude data body and the time-depth transforming relationship, wherein after the position of the target interval is determined, an interface with the continuous in-phase axes and the stable sedimentary environment or a top or bottom interface with the marker bed as the range to be predicted is selected according to a cross-section diagram of the seismic data; the isochronous framework model is constructed based on the background of the actual geological structure and the time-depth transforming relationship; and an isochronous framework model under a T74 marker bed is taken as an example, which is shown in FIG. 7;

Step S700, simulating parameters of an inter-well reservoir: based on the data of the standardized logging curve of each sample well, determining the parameter of the optimal sample number, which can reflect the overall geological condition; selecting data of the characteristic parameters sensitive to the reservoir of the sample wells to construct an initial model, wherein the data has the highest correlation of the seismic waveforms, and the number of pieces of data is equal to the parameter of the optimal sample number; constantly correcting the parameters of the initial model; and outputting high-precision characteristic value simulation result data bodies, wherein the high-precision characteristic value simulation result data bodies data bodies corresponding to the characteristic parameters sensitive to the reservoir one to one; and in the embodiment, Step S700 specifically comprises Step S710-Step S790:

Step S710, optionally selecting a sample well as a reference target well and setting the parameter of the initial sample number as 1;

Step S720, according to the principle of similarity of the waveforms, selecting data of the characteristic parameters of standardized logging curves of the sample wells and data of the characteristic parameters of a standardized logging curve of the reference target well for correlation analysis, so as to obtain the correlation value of the parameter of the sample number and the characteristic parameters of the reference target well, wherein the number of pieces of data of the characteristic parameters of the standardized logging curves of the sample wells is equal to the parameter of the sample number;

Step S730, increasing the parameter of the sample number 1 by 1; repeating the method of Step S720 to obtain the correlation value of the parameter of the sample number and the characteristic parameters of the curve of the reference target well, which corresponds to each parameter of the sample number; and connecting all the correlation values of the parameter of the sample number and the characteristic parameters of the curve of the reference target well, so as to obtain a correlation curve with the correlation of the characteristic parameters of the curve of the reference well changing with the parameter of the sample number;

Step S740, selecting another sample well as a reference target well; repeating the methods of Step S710-Step S730 to obtain multiple correlation curves with the correlation of the characteristic parameters of the curve of the reference well changing with the parameter of the sample number; fitting all the correlation curves with the correlation of the characteristic parameters of the reference well changing with the parameter of the sample number into an overall correlation curve; selecting an inflection point capable of enabling the correlation in the overall correlation curve to be increased with the increase of the sample parameter of the sample number and to be finally kept at a stable position; and determining the parameter of the optimal sample number, wherein a diagram of fitting all the correlation curves with the correlation of the characteristic parameters of the reference well changing with the parameter of the sample number into the overall correlation curve is shown in FIG. 10;

in the embodiment, the wells with the similar low-frequency structure are preferred as space estimation samples by utilizing double variants of the similarity of the waveforms and the spatial distance in the sample wells, so that the low-frequency change of the spatial structure can be better reflected; and two wells with similar seismic waveforms indicates that the sedimentary environment, in which the two wells are located, is similar, low-frequency compositions of the two wells are similar, and the certainty of the inversion result in the low-frequency band is enhanced; and meanwhile, the data range of the high frequency is restricted, and the reliability of the inversion result and the simulation result is improved;

Step S750, based on the high-precision 3D seismic amplitude data body and the isochronous framework model, calculating the correlations of the waveforms of point positions to be detected and the positions of the sample wells; sorting the correlations of the waveforms from large to small; selecting the data of the characteristic parameters sensitive to the reservoir of the sample wells, wherein the data has the highest correlation of the seismic waveforms, and the number of pieces of data is equal to the parameter of the optimal sample number; and based on the characteristic data of the seismic waveforms of the sample wells with the highest correlation, constructing the initial model by an interwell characteristic parameter interpolation manner;

Step S760, based on the initial model, selecting the characteristic parameters sensitive to the reservoir corresponding to the to-be-simulated curve parameters of the sample wells as prior information, wherein the characteristic parameters sensitive to the reservoir have the highest correlation of the seismic waveforms, the number of characteristic parameters sensitive to the reservoir is equal to the parameter of the optimal sample number, and the to-be-simulated curve parameters are curve parameters corresponding to the characteristic parameters sensitive to the reservoir one to one, at least comprise the wave impedance IMP and can also comprise one or more of the caliper CAL, the natural gamma ray GR, the self-potential SP, the data of the resistivity curve: the deep lateral logging RLLD, the shallow lateral logging RLLS and the micro-lateral logging RLLM, and the data of the physical property characterization curve: the compensated neutrons CNL, the compensated acoustic curve AC and the density curve DEN;

Step S770, carrying out matched filtering on the initial model and the prior information, so as to obtain the maximum likelihood function;

Step S780, based on the maximum likelihood function and the prior information, solving the statistical distribution density of the posterior probabilities under a Bayesian framework, and sampling the statistical distribution density of the posterior probabilities to obtain the objective function, wherein in the embodiment, Step S780 specifically comprises:

Step S781, by utilizing the law that the white noise meets Gaussian distribution, expressing the parameter of the high-precision characteristic value simulation result data body as:

$Y=X+N,$ wherein Y represents the parameter of the high-precision characteristic value simulation result data body, X represents the to-be-solved actual characteristic parameter value of the subsurface stratum, and N represents the random noise;

Step S782, as $\|X-X_p\|^2$ also meets Gaussian distribution, determining the initial objective function as:

$$J_1 = \frac{\|X - X_p\|^2}{2\sigma^2}$$

wherein $J_1$ represents the function related to posterior information; $X_p$ represents the expected value of the characteristic parameter, which is obtained by calculation after the steps of selecting the sample wells based on the optimal sample number, carrying out matched filtering on characteristic curves of the sample wells and then solving the statistical distribution density of the posterior probabilities; and a represents the covariance of the white noise; and Step S783, based on the initial objective function, introducing the prior information into the objective function by maximum posterior estimation, so as to obtain the following stable objective function:

$J(Z)=J_1(Z)+\lambda^2 J_2(Z)$ wherein Z represents the wave impedance or the characteristic parameter to be simulated; $J_2$ represents the function related to the prior information of the geological data and the logging data; and λ represents the smoothing parameter used for coordinating the mutual effect between $J_1$ and $J_2$;

Step S790, sampling the distribution of the posterior probabilities by an MCMC (Markov Chain Monte Carlo) method and the criterion for Metropolis-Hastings sampling and by taking the objective function as the input of the initial model; constantly correcting the parameters of the initial model; selecting the solution when the maximum value is selected for the objective function as random implementation; selecting the average value of multiple random implementations as the expected output value; and taking the expected output value as the high-precision characteristic value simulation result data bodies, wherein the parameters in the high-precision characteristic value simulation result data bodies correspond to the characteristic parameters sensitive to the reservoir one to one, wherein Step S790 comprises: Step S791, setting M as the target space, setting n as the total sample number and setting m as the sample number when the Markov chain tends to be stable;

Step S792, presetting a Markov chain to enable the Markov chain to be converged to stable distribution;

Step S793, starting from a certain point $Z_0$ in M, carrying out sampling simulation by the Markov chain and generating a point sequence: $Z_1, \ldots, Z_n$;

Step S794, expressing the expected estimation of the function $J_2(Z)$ as:

$$E[J_2(Z)] = \frac{1}{n-m}\sum_{k=m+1}^{n} f(Z^{(k)}),$$

wherein n represents the generated total sample number, m represents the sample number when the Markov chain is stable, and k represents the accumulated parameter;

Step S795, selecting the transition function $q(Z; Z^{(i-1)})$ and the initial value $Z^{(0)}$, wherein if the parameter value when the $i^{th}$ iteration is started is $Z^{(i-1)}$, the $i^{th}$ iteration process comprises:

extracting the alternative value Z' from $q(Z; Z^{(i-1)})$ and calculating the probability of acceptance $\alpha(Z^{(i-1)}), Z')$ of the alternative value Z':

$$\alpha(Z^{(i-1)}, Z') = \min\left\{\frac{\pi(Z^{(i-1)}; Z')}{\pi(Z^{(i-1)}q(Z'; Z^{(i-1)}))}\right\};$$

Figure 9:
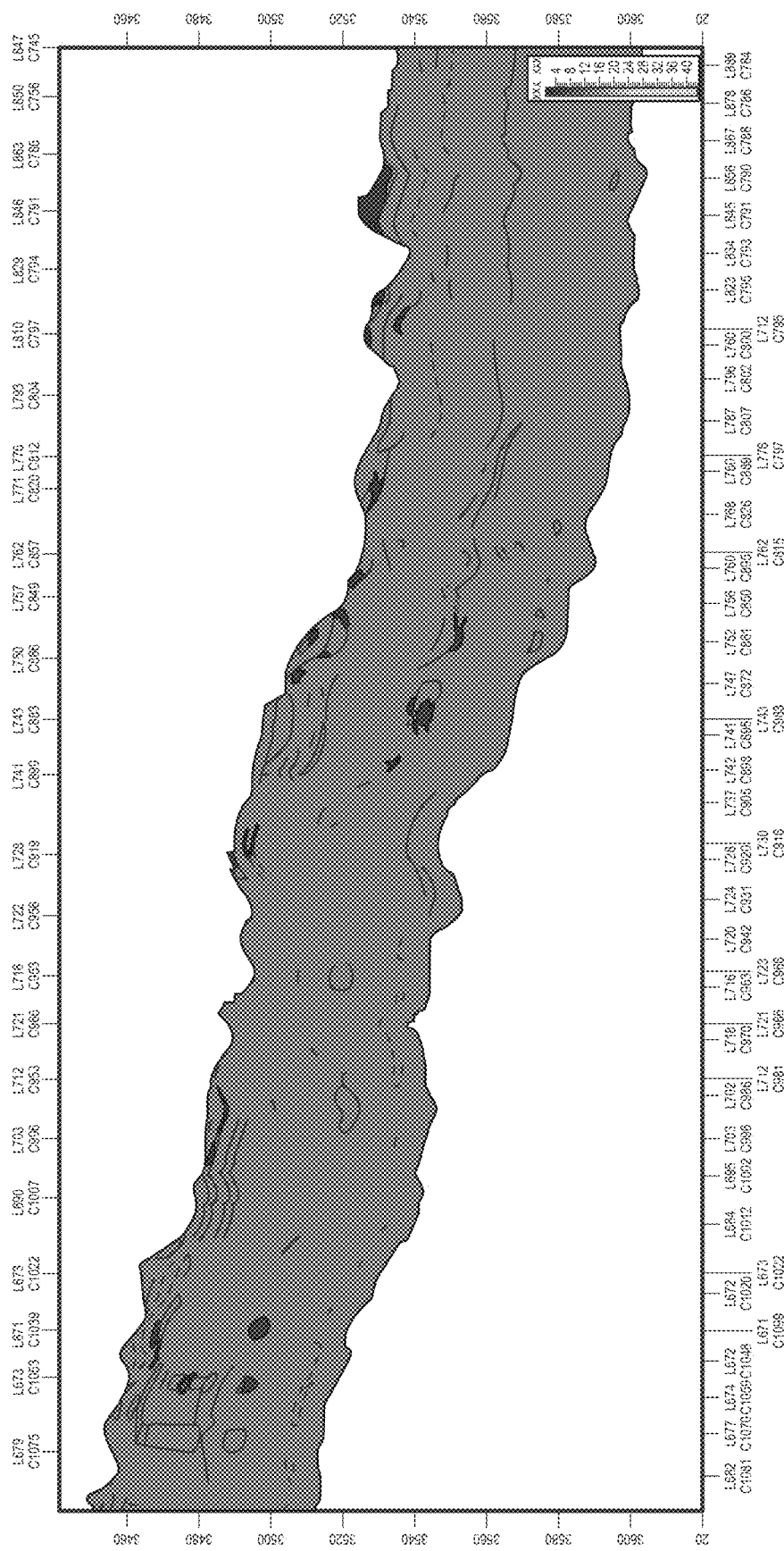
FIG. 9 is a diagram of characterization for a semi-filled reservoir of the paleokarst cave type reservoir in the embodiment of the present invention.

Step S796, enabling $Z^{(i)}=Z'$ with $\alpha(Z^{(i-1)}, Z')$ and enabling $Z^{(i)}=Z^{(i-1)}$ with the probability $1-\alpha(Z^{(i-1)}, Z')$; and Step S797, constantly disturbing the parameters of the initial model, repeating the methods of Step S792-Step S796 to achieve the preset number of iterations n, and obtaining posterior samples $Z^{(1)} Z^{(2)} Z^{(3)} \ldots Z^{(n)}$, so as to calculate the matrix at each order of posterior distribution to obtain the expected output value, wherein the expected output value is taken as the high-precision characteristic value simulation result data bodies;

Step S800, characterizing the boundary of an inter-well karst cave system: drawing a histogram of the wave impedance curves based on the wave impedance curves in the characteristic parameters sensitive to the reservoir of the sample wells, and determining the wave impedance threshold of the paleokarst cave and the surrounding rock;

based on the wave impedance threshold of the paleokarst cave and the surrounding rock, defining the region that is greater than the impedance threshold in the high-precision characteristic value simulation result data bodies as a bed rock of a carbonate rock, and defining the region that is lower than the impedance threshold as the development position of the paleokarst cave type reservoir, so as to obtain the structure characteristics and the spatial distribution law of the paleokarst cave type reservoir, wherein the structure characteristics and the spatial distribution law of the paleokarst cave type reservoir with the depth of over 2 m can be obtained; and the columnar statistical diagram of the wave impedance curves is shown in FIG. 6;

Step S900, characterizing the lithological and physical boundaries of internal filling of the cave: constructing a cross plot based on the characteristic parameters sensitive to the reservoir, and carrying out box selection on data points in the cross plot as logging interpretation sample points according to the lithological information and the physical information of the individual depth segment, so as to obtain the interpretation conclusion threshold of the filling degree and the types of the fillings;

carrying out cross analysis on the high-precision characteristic value simulation result data bodies by the interpretation conclusion threshold, so as to obtain the internal filling degree of the cave and the characteristics of the 3D spatial morphologies of the combination of the fillings, wherein in the embodiment, the step of identifying the filling characteristics in Step S900 comprises:

Step S910, constructing a template of the cross plot by taking the wave impedance value and the natural GR value as the characteristic parameters sensitive to the reservoir;

Step S920, based on the template of the cross plot and according to the lithological information and the physical information of the individual depth segment, dividing the sample points into fully filled sample points, semi-filled sample points and bed rock sample points;

Step S930, carrying out box selection on the semi-filled sample points with the better reservoir property and calculating to obtain the 2D cross plot interpretation conclusion threshold; and Step S940, inputting the 2D cross plot interpretation conclusion threshold into a 3D natural GR characteristic parameter simulation data body and a wave impedance inversion data body and characterizing the spatial structure morphology of a semi-filled reservoir, so as to obtain the characteristics of the 3D spatial morphologies of the semi-filled part of the paleokarst cave; and in the embodiment, Step S900 also comprises the step of acquiring other filling characteristics of the paleokarst cave:

Step S950, based on the template of the cross plot and according to the lithological information and the physical information of the individual depth segment, dividing the sample points into bed rock sample points, sedimentation filled sample points, chemically filled sample points, collapse filled sample points and mixed filled sample points; carrying out box selection on the sample points of all types of fillings; respectively calculating the corresponding interpretation conclusion threshold; respectively characterizing the corresponding spatial structure morphologies, so as to obtain the characteristics of the 3D spatial morphologies of the fillings of the paleokarst cave; and finally, obtaining the spatial distribution, the distribution law of the fillings and the 3D spatial morphologies corresponding to the filling degree of the paleokarst cave, wherein a diagram of box selection for a semi-filled sample of the paleokarst cave type reservoir is shown in FIG. 8, and a diagram of characterization for a semi-filled reservoir of the paleokarst cave type reservoir is shown in FIG. 9; and Step S1000, characterizing the structure and the filling of the paleokarst cave: based on the structure characteristics and the spatial distribution law of the paleokarst cave type reservoir as well as the internal filling degree of the cave and the characteristics of the 3D spatial morphologies of the combination of the fillings, engraving the spatial distribution of the paleokarst cave and the development characteristics of the internal filling by adopting a lithology shielding technology and a 3D engraving technology.

A system for analyzing filling for the karst reservoir based on spectrum decomposition and machine learning in a second embodiment of the present invention comprises: an original geophysical logging data acquisition module, a seismic data acquisition module, an original geophysical logging data preprocessing module, a seismic data preprocessing module, a well-to-seismic calibration and characteristic parameter selection module, an isochronous framework model constructing module, an inter-well characteristic parameter simulation module, a module for characterizing the boundary of the inter-well karst cave system, a module for characterizing the lithological and physical boundaries of internal filling of the karst cave and a 3D module for describing the structure and the filling characteristics of the paleokarst cave;

the original geophysical logging data acquisition module is configured to acquire the original logging data of each sample well by the logging equipment, comprising: measuring the self-potential SP of each sample well by the measuring electrode, measuring the natural gamma ray GR of each sample well by the natural gamma ray downhole device and the natural gamma ray ground instrument, and acquiring the caliper CAL of each sample well by the caliper arm; and acquiring the data of the resistivity curve: the deep lateral logging RLLD, the shallow lateral logging RLLS and the micro-lateral logging RLLM, and the data of the physical property characterization curve: the compensated neutrons CNL, the compensated acoustic curve AC and the density curve DEN by the traditional logging equipment; and acquire the definite lithological information and physical information of the individual depth segment based on the imaging logging information, the drilling information, the mud logging information and the rock-core information, so as to determine the depth data of the marker bed at the target horizon;

the seismic data acquisition module is configured to acquire the data of the original seismic wave reflected signal by the seismic wave excitation device and the receiving device and acquire isochronous 3D distribution of the marker bed at the target horizon according to the waveform of the data of the original seismic wave reflected signal;

the original geophysical logging data preprocessing module is configured to draw the data of the logging curves based on the original logging data of the sample wells and carry out abnormal value processing and standardization processing, so as to obtain the data of the standardized logging curves;

the seismic data preprocessing module is configured to obtain the high-precision 3D seismic amplitude data body by mixed-phase wavelet estimation and maximum posteriori deconvolution and enhancing diffusion filtering based on the data of the seismic wave reflected signal;

the well-to-seismic calibration and characteristic parameter selection module is configured to acquire the wave impedance curve of each sample well based on the compensated acoustic curve AC and the density curve DEN in the data of the standardized logging curve, so as to calculate the reflection coefficient curve; acquire the preferred frequency of the ricker wavelet, so that the preferred frequency is consistent with the dominant frequency of the high-precision 3D seismic amplitude data body; carry out convolution operation on the ricker wavelet and the reflection coefficient curve, so as to obtain the synthetic seismic record; compare the depth data of the marker bed at the target horizon and the isochronous 3D distribution of the marker bed at the target horizon for well-to-seismic calibration; calculate the correlation between the synthetic seismic record and the waveform of the near-well seismic channel; and when the correlation is more than or equal to the preset first threshold, judge that the result of well-to-seismic calibration is qualified, so as to obtain the time-depth transforming relationship between the data of the logging curve and the seismic record and the characteristic parameters sensitive to the reservoir, wherein the method for obtaining the characteristic parameters sensitive to the reservoir comprises:

drawing the columnar statistical graph of the responses of logging parameters, which are generated to the different geological bodies near the wells; and when the numerical value of the data of the certain standardized logging curve can be used for distinguishing the data points that are more than the second threshold preset by the different logging interpretation conclusions, selecting the data of the standardized logging curve as the characteristic parameters sensitive to the reservoir, wherein the characteristic parameters sensitive to the reservoir at least comprise the wave impedance IMP and can also comprise one or more of the caliper CAL, the natural gamma ray GR, the self-potential SP, the data of the resistivity curve: the deep lateral logging RLLD, the shallow lateral logging RLLS and the micro-lateral logging RLLM, and the data of the physical property characterization curve: the compensated neutrons CNL, the compensated acoustic curve AC and the density curve DEN;

the isochronous framework model constructing module is configured to construct the isochronous framework model based on the law of sedimentary strata reflected by the high-precision 3D seismic amplitude data body and the time-depth transforming relationship;

the inter-well characteristic parameter simulation module is configured to determine the parameter of the optimal sample number, which can reflect the overall geological condition, based on the data of the standardized logging curve of each sample well; select the data of the characteristic parameters sensitive to the reservoir of the sample wells to construct the initial model, wherein the data has the highest correlation of the seismic waveforms, and the number of pieces of data is equal to the parameter of the optimal sample number; constantly correct the parameters of the initial model; and output the high-precision characteristic value simulation result data bodies, wherein the high-precision characteristic value simulation result data bodies are the data bodies corresponding to the characteristic parameters sensitive to the reservoir one to one;

the module for characterizing the boundary of the inter-well karst cave system is configured to draw the histogram of the wave impedance curves based on the wave impedance curves IMP in the characteristic parameters sensitive to the reservoir of the sample wells, and determine the wave impedance threshold for distinguishing the paleokarst cave and the surrounding rock; and based on the wave impedance threshold of the paleokarst cave and the surrounding rock, define the region that is greater than the impedance threshold in the high-precision characteristic value simulation result data bodies as the bed rock of the carbonate rock, and define the region that is lower than the impedance threshold as the development position of the paleokarst cave type reservoir, so as to obtain the structure characteristics and the spatial distribution law of the paleokarst cave type reservoir;

the module for characterizing the lithological and physical boundaries of internal filling of the karst cave is configured to characterize the lithological and physical boundaries of internal filling of the cave: constructing the cross plot based on the characteristic parameters sensitive to the reservoir, and carrying out box selection on the data points in the cross plot as the logging interpretation sample points according to the lithological information and the physical information of the individual depth segment, so as to obtain the interpretation conclusion threshold of the filling degree and the types of the fillings; and carrying out cross analysis on the high-precision characteristic value simulation result data bodies by the interpretation conclusion threshold, so as to obtain the internal filling degree of the cave and the characteristics of the 3D spatial morphologies of the combination of the fillings; and the 3D module for describing the structure and the filling characteristics of the paleokarst cave is configured to describe the structure and the filling of the paleokarst cave: based on the structure characteristics and the spatial distribution law of the paleokarst cave type reservoir as well as the internal filling degree of the cave and the characteristics of the 3D spatial morphologies of the combination of the fillings, engraving the spatial distribution of the paleokarst cave and the development characteristics of the internal filling by adopting the lithology shielding technology and the 3D engraving technology.

Those skilled in the art can clearly understand that in order to describe the present invention conveniently and concisely, the specific work process and related description of the system described above can refer to the corresponding process in the embodiment of the method described above, which are not repeated here.

It should be noted that: for the system for analyzing filling for the karst reservoir based on spectrum decomposition and machine learning, which is provided by the above embodiment, only the division of all the above function modules is illustrated, and in the actual application, the above function allocation can be completed by different function modules as required, namely, the modules or the steps in the embodiment of the present invention are decomposed or recombined; and for example, the modules in the above embodiment can be combined into one module or can be further split into a plurality of sub-modules, so as to complete all or a part of the functions described above. The names of the modules and the steps involved in the embodiment of the present invention are only used for distinguishing all the modules or the steps and are not regarded as the improper limit to the present invention.

Electronic equipment in a third embodiment of the present invention comprises:
at least one processor; and
a memory that is in communication connection with the at least one processor, wherein
the memory is configured to store instructions capable of being executed by the processor(s), and the instructions are used for being executed by the processor(s) for realizing the method for analyzing filling for the karst reservoir based on spectrum decomposition and machine learning.

A computer readable storage medium in a fourth embodiment of the present invention is configured to store computer instructions; and the computer instructions are used for being executed by a computer for realizing the method for analyzing filling for the karst reservoir based on spectrum decomposition and machine learning.

Those skilled in the art can clearly understand that in order to describe the present invention conveniently and concisely, the specific work process and related description of a storage device and a processing device that are described above can refer to the corresponding process in the embodiment of the method described above, which are not repeated here.

Computer program codes used for executing the operation of the present application can be edited by adopting one or multiple programming languages or the combination thereof, and the above programming language comprises an object-oriented programming language, such as Java, Smalltalk and C++ and also comprises a conventional procedure programming language, such as a 'C' language or a similar programming language. The program codes can be completely/partly executed on the computer of a user; or the program codes can be executed as an independent software package; or a part of the program codes can be executed on the computer of the user, and a part of the program codes can be executed on a remote computer; or the program codes can be completely executed on the remote computer or a server. In the case that the remote computer is involved, the remote computer can be connected to the computer of the user by any type of network which comprises an LAN (Local Area Network) or a WAN (Wide Area Network), or can be connected to an outer computer (for example, the remote computer can be connected by an Internet by using an Internet service provider).

A flow chart and block diagrams in the drawings show the system architecture, functions and operations that may be realized according to the system, the method and a computer program product of all the embodiments of the present application. In the regard, each block in the flow chart or the block diagrams can represent one module, a program segment or a part of the codes, and the module, the program segment or a part of the codes comprises one or more executable instructions used for realizing specified logic functions. It should also be noted that the functions marked in the blocks may also be generated in the order different from that marked in the drawings in some implementations as the replacements. For example, two blocks shown in succession can actually be executed in parallel basically, and sometimes, the two blocks can also be executed in reverse order, which are determined according to the involved functions. It should also be noted that each block in the block diagrams and/or the flow chart and the combination of the blocks in the block diagrams and/or the flow chart can be realized by a dedicated hardware-based system for executing the specified functions or operations or can be realized by the combination of dedicated hardware and the computer instructions.

The terms: 'first', 'second' and so on are used for distinguishing similar objects, rather than for describing or expressing a specific order or sequence.

The term 'comprise' or any other similar term aims to cover non-exclusive 'comprise', so that a process, a method, an article or equipment/a device comprising a series of elements not only comprise those elements, but also comprise other elements that are not listed definitely, or comprise inherent elements of the process, the method, the article or the equipment/the device.

So far, the technical scheme of the present invention is described by the preferred implementation manners shown through combination with the drawings; however, those skilled in the art easily understand that the protection scope of the present invention is apparently not limited to the specific implementation manners. Those skilled in the art can make equivalent modifications or replacements to the related technical characteristics on the premise of not departing from the principle of the present invention, and the technical schemes after the modifications or replacements are made shall fall within the protection scope of the present invention.

What is claimed is:

1. A method for analyzing filling for a karst reservoir based on spectrum decomposition and machine learning, and describing a structure of the karst reservoir by adopting a lithology shielding technology and a 3D engraving technology for reservoir identification, the method comprising:
    configuring at least one processor and a memory that is in communication connection with the at least one processor, wherein the memory is configured to store instructions capable of being executed by the processor; the instructions being executed by the processor for realizing the method in following steps:
    Step S100, acquiring original geophysical logging data that comprises:
        acquiring original logging data of each sample well by logging equipment, comprising: measuring a self-potential SP of each sample well by a measuring electrode, measuring a natural gamma ray GR of each sample well by a natural gamma ray downhole device and a natural gamma ray ground instrument, and acquiring a caliper CAL of each sample well by a caliper arm; and acquiring data of a resistivity curve: deep lateral logging RLLD, shallow lateral logging RLLS and micro-lateral logging RLLM, and data of a physical property characterization curve: compensated neutrons CNL, a compensated acoustic curve AC and a density curve DEN by traditional logging equipment; and
        acquiring definite lithological information and physical information of an individual depth segment based on imaging logging information, drilling information, mud logging information and rock-core information, so as to determine depth data of a marker bed at a target horizon;
    Step S200, acquiring seismic data that comprises:
        acquiring data of an original seismic wave reflected signal by a seismic wave excitation device and a receiving device and acquiring isochronous 3D distribution of the marker bed at the target horizon according to a waveform of the data of the original seismic wave reflected signal;
    Step S300, preprocessing original geophysical logging data that comprises:
        drawing data of logging curves based on all original logging data of the sample wells and carrying out abnormal value processing and standardization processing, so as to obtain data of standardized logging curves;
    Step S400, preprocessing the seismic data that comprises:
        obtaining a high-precision 3D seismic amplitude data body by mixed-phase wavelet estimation and maximum posteriori deconvolution and enhancing diffusion filtering based on the data of the seismic wave reflected signal;
    Step S500, carrying out well-to-seismic calibration and selecting characteristic parameters, wherein the well-to-seismic calibration comprises:
        acquiring a wave impedance curve of each sample well based on the compensated acoustic curve AC and the density curve DEN in the data of the standardized logging curve, so as to calculate a reflection coefficient curve;
        acquiring a preferred frequency of a ricker wavelet, so that the preferred frequency is consistent with a dominant frequency of the high-precision 3D seismic amplitude data body; carrying out convolution operation on the ricker wavelet and the reflection coefficient curve, so as to obtain a synthetic seismic record;
        comparing the depth data of the marker bed at the target horizon and a isochronous 3D distribution of the marker bed at the target horizon for well-to-seismic calibration; calculating a correlation between the synthetic seismic record and a waveform of a near-well seismic channel; and when the correlation is more than or equal to a preset first threshold, judging that a result of well-to-seismic calibration is qualified, so as to obtain the time-depth transforming relationship between the data of the logging curve and the seismic record and the characteristic parameters sensitive to the reservoir,
    wherein a method for obtaining the characteristic parameters sensitive to the reservoir comprises:
        drawing a columnar statistical graph of responses of the logging parameters, which are generated to different geological bodies near the wells; and when a numerical value of data of a certain standardized logging curve used for distinguishing data points that are more than a second threshold preset by different logging interpretation conclusions, selecting the data of the standardized logging curve as the characteristic parameters sensitive to the reservoir, wherein the characteristic parameters sensitive to the reservoir at least comprise the wave impedance IMP and can also comprise one or more of the caliper CAL, the natural gamma ray GR, the self-potential SP, the data of the resistivity curve: the deep lateral logging RLLD, the shallow lateral logging RLLS and the micro-lateral logging RLLM, and the data of the physical property characterization curve: the compensated neutrons CNL, the compensated acoustic curve AC and the density curve DEN;
    Step S600, constructing an isochronous framework model that comprises:
        constructing the isochronous framework model based on law of sedimentary strata reflected by the high-precision 3D seismic amplitude data body and the time-depth transforming relationship;

Step S700, simulating the parameters of an inter-well reservoir that comprises:
  based on the data of the standardized logging curve of each sample well, determining the parameter of an optimal sample number, which can reflect an overall geological condition; selecting data of the characteristic parameters sensitive to the reservoir of the sample wells to construct an initial model, wherein the data has the highest correlation of the seismic waveforms, and a number of pieces of data is equal to the parameter of the optimal sample number; constantly correcting the parameters of the initial model; and outputting high-precision characteristic value simulation result data bodies, wherein the high-precision characteristic value simulation result data bodies are data bodies corresponding to the characteristic parameters sensitive to the reservoir one to one;

Step S800, characterizing a boundary of an inter-well karst cave system that comprises:
  drawing a histogram of the wave impedance curves based on the wave impedance curves IMP of the sample wells in the characteristic parameters sensitive to the reservoir, and determining wave impedance threshold for distinguishing a paleokarst cave and a surrounding rock; and
  based on the wave impedance threshold of the paleokarst cave and the surrounding rock, defining the region that is greater than the wave impedance threshold for distinguishing the paleokarst cave and the surrounding rock in the high-precision characteristic value simulation result data bodies as a bed rock of a carbonate rock, and defining the region that is lower than the wave impedance threshold for distinguishing the paleokarst cave and the surrounding rock as the development position of the paleokarst cave type reservoir, so as to obtain the structure characteristics and a spatial distribution law of the paleokarst cave type reservoir;

Step S900, characterizing the lithological and physical boundaries of internal filling of the cave that comprises:
  constructing a cross plot based on the characteristic parameters sensitive to the reservoir, and carrying out box selection on data points in the cross plot as logging interpretation sample points according to the lithological information and the physical information of the individual depth segment, so as to obtain the interpretation conclusion threshold of the filling degree and the types of fillings;
  carrying out a cross analysis on the high-precision characteristic value simulation result data bodies by the interpretation conclusion threshold, so as to obtain the internal filling degree of the cave and characteristics of a 3D spatial morphologies of the combination of the fillings; and Step S1000, describing the structure of the paleokarst cave and the filling for the paleokarst cave that comprises:
  engraving the spatial distribution of the paleokarst cave and the development characteristics of the internal filling, by adopting a lithology shielding technology and a 3D engraving technology, based on structure characteristics and the spatial distribution law of the paleokarst cave type reservoir as well as the internal filling degree of the cave and the characteristics of the 3D spatial morphologies of the combination of the fillings, to generate a diagram characterizing the paleokarst cave;

wherein the method is configured to determine a position of the paleokarst cave of an interval of interest, divide the paleokarst cave into a fully filled reservoir, a semi-filled reservoir and a bed rock reservoir according to the filling degree, and divide a type of the reservoir into a sedimentation filled reservoir, a collapse filled reservoir, a chemically filled reservoir and a mixed filled reservoir by utilizing lithological and physical characteristics of geological bodies, thereby enabling reservoir identification.

2. The method according to claim 1, wherein the step of measuring the self-potential SP of each sample well by the measuring electrode and measuring the natural gamma ray GR of each sample well by the natural gamma ray downhole device and the natural gamma ray ground instrument specifically comprises:
  measuring the self-potential SP of each sample well by the measuring electrode:
  arranging a measuring electrode Q on the ground and arranging a measuring electrode Z under the well by a cable;
  lifting the measuring electrode Z along the well axis to measure the change of the self-potential with the well depth, wherein
  a calculation method of the value of the self-potential is shown as follows:

$$E_A = E_d - E_{da} = (K_d - K_{da}) lg \frac{R_{mf}}{R_w} = Klg \frac{R_{mf}}{R_w}$$

wherein $E_A$ represents the total self-potential; $K_d$ represents the coefficient of diffusion potential; $K_{da}$ represents the coefficient of diffusion and adsorption potential; $R_{ref}$ represents the value of resistivity of mud filtrate; and $R_W$ represents the value of resistivity of stratum water; and
  measuring the natural gamma ray GR of each sample well by the natural gamma ray downhole device and the natural gamma ray ground instrument:
  wherein the natural gamma ray downhole device comprises a detector, an amplifier and a high-voltage power supply;
  acquiring the natural gamma ray by the detector, transforming the natural gamma ray into an electric pulse signal and amplifying the electric pulse signal by the amplifier; and
  transforming the number of electric pulses formed in each minute into the potential difference and recording the potential difference by the ground instrument.

3. The method according to claim 1, wherein Step S300 comprises:
  Step S310, drawing data of an original logging curve based on the original logging data;
  Step S320, removing outliers to obtain data of the logging curve with the outliers removed based on the data of the original logging curve; and
  Step S330, superposing all data of a histogram of the single logging curve at the positions of the sample wells in a work area based on the data of the logging curve with the outliers removed, and integrating the thresholds to obtain the data of the standardized logging curve.

4. The method according to claim 1, wherein Step S400 specifically comprises:

Step S410, based on the data of the seismic wave reflected signal, expressing a frequency domain seismic record convolution model as:

$$s(\omega)=\sigma(\omega)\varepsilon(\omega),$$

wherein $s(\omega)$ represents the seismic record after Fourier transformation; $\sigma(\omega)$ represents the wavelet after Fourier transformation; $\varepsilon(\omega)$ represents the frequency spectrum of the reflection coefficient after Fourier transformation; and $\omega$ represents the angular frequency;

Step S420, transforming logarithms on the two sides of the equation of the frequency domain seismic record convolution model into a linear system to obtain a linear seismic record convolution model:

$$\ln s(\omega)=\ln \sigma(\omega)+\ln \varepsilon(\omega)$$

Step S430, carrying out inverse Fourier transformation on the linear seismic record convolution model to obtain a complex cepstrum sequence:

$$\tilde{s}(t)=\tilde{\sigma}(t)+\tilde{\varepsilon}(t)$$

wherein $\tilde{s}(t)$ represents a complex cepstrum sequence of a seismic waveform record; $\tilde{\sigma}(t)$ represents a complex cepstrum sequence of the seismic wavelet; $\tilde{\varepsilon}(t)$ represents a complex cepstrum sequence of the stratum reflection coefficient; and t represents the time of the seismic waveform record;

Step S440, based on the complex cepstrum sequence, separating the wavelet and the reflection coefficient by a low-pass filter and extracting a wavelet amplitude spectrum;

Step S450, acquiring a simulated seismic wavelet amplitude spectrum by a least square method:

$$\sigma(f)=A(f)f^{\alpha}e^{H(f)}$$

wherein the fitting parameter $\alpha \geq 0$ of the least square method is a constant; $\sigma(f)$ represents the wavelet amplitude spectrum; H(f) and A(f) represent the polynomials of f; and f represents the frequency of the seismic wavelet;

Step S460, based on the simulated seismic wavelet amplitude spectrum, obtaining the maximum phase component and the minimum phase component of the wavelet, wherein it is assumed that the maximum phase component of the wavelet $\sigma(t)$ is u(t), and the minimum phase component of the wavelet $\sigma(t)$ is v(t), the wavelet $\sigma(t)$ is:

$$\sigma(t)=u(t)\cdot v(t)$$

the complex cepstrum of the amplitude spectrum is expressed as follows:

$$2\widetilde{\sigma_0}(t)=\tilde{u}(t)+\tilde{v}(t)+\tilde{u}(-t)+\tilde{v}(-t)$$

wherein the complex cepstrum $\widetilde{\sigma_0}(t)$ of the amplitude spectrum is displayed symmetrically on the positive axis and the negative axis; $\tilde{v}(-t)$ represents the complex cepstrum of the minimum phase function corresponding to the maximum phase component v(t) of the seismic wavelet; and $\tilde{u}(-t)$ represents the complex cepstrum of the maximum phase function corresponding to the minimum phase component u(t) of the seismic wavelet;

Step S470, based on the complex cepstrum in the amplitude spectrum, determining a group of mixed-phase wavelet sets with the same amplitude spectrum; constantly adjusting the parameters of the Yu wavelet; keeping the low frequency, broadening the high frequency and properly increasing the dominant frequency to construct the expected output wavelet form; and looking for the best balance point for improving the resolution ratio and the fidelity with reference to a signal-to-noise ratio spectrum under the control of the logging curves, so as to obtain data of the waveform after shaping;

Step S480, based on the data of the waveform after shaping, constructing a tensor diffusion model:

$$\begin{cases} \dfrac{\partial U}{\partial \tau} = div(D \cdot \nabla U) \\ U|_{\tau=0} = U_0 \end{cases}$$

wherein $\tau$ represents the diffusion time; div represents the divergence operator; D represents the tensor type diffusion coefficient of a diffusion filter; U represents the diffusion filtering result; $U|_{\tau=0}$ represents the diffusion filtering result when $\tau=0$; $U_0$ represents the data of the waveform after shaping when $\tau=0$; and as the initial condition of the tensor diffusion model, $\nabla U$ represents the gradient of the diffusion filtering result;

based on the tensor diffusion model, constructing the gradient structure tensor:

$$J_o(\nabla U)=G_o*J_0=G_o*(\nabla U(\nabla U)^T)$$

wherein U represents the diffusion filtering result, and $J_0$ represents the tensor product of the gradient vector;

the Gaussian function with the scale of $\rho$ is expressed by $G_\rho$:

$$G_\rho(r)=(2\pi\rho^2)^{-3/2}\exp(-|r|^2/(2\rho^2))$$

wherein r represents the calculation radius;
the characteristic vector of the structure tensor is:

$$J_p(\nabla U) = \begin{pmatrix} v_1 & v_2 & v_3 \end{pmatrix} \begin{pmatrix} \lambda_1 & 0 & 0 \\ 0 & \lambda_2 & 0 \\ 0 & 0 & \lambda_3 \end{pmatrix} \begin{pmatrix} v_1 & v_2 & v_3 \end{pmatrix}^T$$

wherein $v_1$, $v_2$ and $v_3$ represent three characteristic vectors of the gradient structure tensor and regarded as a local orthogonal coordinate system; $v_1$ points to the gradient direction of the seismic signal; a plane formed by $v_2$ and $v_3$ is in parallel to the local structure characteristics of the seismic signal; and $\lambda_1$, $\lambda_2$ and $\lambda_3$ represent three characteristic values corresponding to $v_1$, $v_2$ and $v_3$ respectively;

Step S490, based on the characteristic vector of the structure tensor, respectively calculating the confidence degree of a linear structure, the confidence degree of a face structure and the diffusion tensor, wherein the confidence degree $C_{line}$ of the linear structure is:

$$C_{line} = \frac{\lambda_2 - \lambda_3}{\lambda_2 + \lambda_3}$$

the confidence degree $C_{plane}$ of the face structure is:

$$C_{plane} = \frac{\lambda_1 - \lambda_2}{\lambda_1 + \lambda_2}$$

and the diffusion tensor D is:

$$D = (v_1 \ v_2 \ v_3)\begin{pmatrix} \mu_1 & 0 & 0 \\ 0 & \mu_2 & 0 \\ 0 & 0 & \mu_3 \end{pmatrix}(v_1 \ v_2 \ v_3)^T = \begin{pmatrix} D_{11} & D_{12} & D_{13} \\ D_{21} & D_{22} & D_{23} \\ D_{31} & D_{32} & D_{33} \end{pmatrix}$$

wherein $\mu_1$, $\mu_2$ and $\mu_3$ represent three non-negative characteristic values of the diffusion tensor and respectively represent the intensity of filtering of the diffusion filter in the three characteristic directions $v_1$, $v_2$ and $v_3$; and Step S4100, repeating the steps S480-S490 until the preset number of iterations is achieved, so as to obtain the diffusion filtering result, i.e. the high-precision 3D seismic amplitude data body.

5. The method according to claim 4, wherein a calculation method of the simulated seismic wavelet amplitude spectrum comprises:

positioning the maximum value of an amplitude spectrum in the data of the seismic wave reflected signal and the frequency corresponding to the maximum value;

fitting the maximum value of the amplitude spectrum of the seismic signal and the simulated seismic wavelet amplitude spectrum by the least square method to obtain the coefficients of the polynomials of the parameters $\alpha$ and HM so as to obtain the fit amplitude value of the corresponding frequency of the maximum value; and dividing the fit amplitude value of the corresponding frequency by the maximum value of the amplitude spectrum of the seismic signal, so as to fit the coefficient of the polynomial A(f) by the quotient.

6. The method according to claim 1, wherein Step S700 specifically comprises Step S710-Step S790:

Step S710, optionally selecting a sample well as a reference target well and setting the parameter of the initial sample number as 1;

Step S720, according to the principle of similarity of the waveforms, selecting data of the characteristic parameters of the standardized logging curves of the sample wells and data of the characteristic parameters of a standardized logging curve of the reference target well for correlation analysis, so as to obtain the correlation value of the parameter of the sample number and the characteristic parameters of the reference target well, wherein the number of pieces of data of the characteristic parameters of the standardized logging curves of the sample wells is equal to the parameter of the sample number;

Step S730, increasing the parameter of the sample number 1 by 1; repeating the method of Step S720 to obtain the correlation value of the parameter of the sample number and the characteristic parameters of the curve of the reference target well, which corresponds to each parameter of the sample number; and connecting all the correlation values of the parameter of the sample number and the characteristic parameters of the curve of the reference target well, so as to obtain a correlation curve with the correlation of the characteristic parameters of the curve of the reference well changing with the parameter of the sample number;

Step S740, selecting another sample well as a reference target well; repeating the methods of Step S710-Step S730 to obtain multiple correlation curves with the correlation of the characteristic parameters of the curve of the reference well changing with the parameter of the sample number; fitting all the correlation curves with the correlation of the characteristic parameters of the reference well changing with the parameter of the sample number into an overall correlation curve; selecting an inflection point capable of enabling the correlation in the overall correlation curve to be increased with the increase of the parameter of the sample number and to be finally kept at a stable position; and determining the parameter of the optimal sample number;

Step S750, based on the high-precision 3D seismic amplitude data body and the isochronous framework model, calculating the correlations of the waveforms of point positions to be detected and the positions of the sample wells; sorting the correlations of the waveforms from large to small; selecting the data of the characteristic parameters sensitive to the reservoir of the sample wells, wherein the data has the highest correlation of the seismic waveforms, and the number of pieces of data is equal to the parameter of the optimal sample number; and based on the sample well corresponding to the characteristic data of the seismic waveform of the sample well with the highest correlation, constructing the initial model by an inter-well characteristic parameter interpolation manner;

Step S760, based on the initial model, selecting the characteristic parameters sensitive to the reservoir corresponding to the to-be-simulated curve parameters of the sample wells as prior information, wherein the characteristic parameters sensitive to the reservoir have the highest correlation of the seismic waveforms, the number of characteristic parameters sensitive to the reservoir is equal to the parameter of the optimal sample number, and the to-be-simulated curve parameters are curve parameters corresponding to the characteristic parameters sensitive to the reservoir one to one, at least comprise the wave impedance IMP and can also comprise one or more of the caliper CAL, the natural gamma ray GR, the self-potential SP, the data of the resistivity curve: the deep lateral logging RLLD, the shallow lateral logging RLLS and the micro-lateral logging RLLM, and the data of the physical property characterization curve: the compensated neutrons CNL, the compensated acoustic curve AC and the density curve DEN;

Step S770, carrying out matched filtering on the initial model and the prior information, so as to obtain the maximum likelihood function;

Step S780, based on the maximum likelihood function and the prior information, solving the statistical distribution density of the posterior probabilities under a Bayesian framework, and sampling the statistical distribution density of the posterior probabilities to obtain the objective function; and Step S790, sampling the distribution of the posterior probabilities by an MCMC method and the criterion for Metropolis-Hastings sampling and by taking the objective function as the input of the initial model; constantly optimizing the parameters of the initial model; selecting the solution when the maximum value is selected for the objective function as random implementation; selecting the average value of multiple random implementations as the expected output value; and taking the expected output value as the high-precision characteristic value simulation result data bodies, wherein the parameters in the high-precision characteristic value simulation result data bodies correspond to the characteristic parameters sensitive to the reservoir one to one.

7. The method for according to claim 6, wherein Step S780 specifically comprises:

Step S781, by utilizing the law that the white noise meets Gaussian distribution, expressing the parameter of the high-precision characteristic value simulation result data body as:

$$Y=X+N$$

wherein Y represents the parameter of the high-precision characteristic value simulation result data body, X represents the to-be-solved actual characteristic parameter value of the subsurface stratum, and N represents the random noise;

Step S782, as $\|X-X_p\|^2$ also meets Gaussian distribution, determining the initial objective function as:

$$J_1 = \frac{\|X - X_p\|^2}{2\sigma^2}$$

wherein $J_1$ represents the function related to posterior information; $X_p$ represents the expected value of the characteristic parameter, which is obtained by calculation after the steps of selecting the sample wells based on the optimal sample number, carrying out matched filtering on characteristic curves of the sample wells and then solving the statistical distribution density of the posterior probabilities; and represents the covariance of the white noise; and Step S783, based on the initial objective function, introducing the prior information into the objective function by maximum posterior estimation, so as to obtain the following stable objective function:

$$J(Z)=J_1(Z)+\lambda^2 J_2(Z)$$

wherein Z represents the characteristic parameter to be simulated; $J_2$ represents the function related to the prior information of the geological data and the logging data; and $\lambda$ represents the smoothing parameter used for coordinating the mutual effect between $J_1$ and $J_2$.

8. The method according to claim 6, wherein Step S790 specifically comprises:

Step S791, setting M as the target space, setting n as the total sample number and setting m as the sample number when the Markov chain is stable;

Step S792, presetting a Markov chain to enable the Markov chain to be converged to stable distribution;

Step S793, starting from a certain point $Z_0$ in M, carrying out sampling simulation by the Markov chain and generating a point sequence: $Z_1, \ldots, Z_n$;

Step S794, expressing the expected estimation of the function $J_2(Z)$ as:

$$E[J_2(Z)] = \frac{1}{n-m}\sum_{k=m+1}^{n} f(Z^{(k)})$$

wherein n represents the generated total sample number, m represents the sample number when the Markov chain is stable, and k represents the accumulated parameter;

Step S795, selecting the transition function $q(Z;Z^{(i-1)})$ and the initial value $Z^{(0)}$, wherein if the parameter value when the $i^{th}$ iteration is started is $Z^{(i-1)}$, the $i^{th}$ iteration process comprises:

extracting the alternative value Z' from $q(Z;Z^{(i-1)})$ and calculating the probability of acceptance $\alpha(Z^{(i-1)},Z')$ of the alternative value Z':

$$\alpha(Z^{(i-1)}, Z') = \min\left\{\frac{\pi(Z^{(i-1)}; Z')}{\pi(Z^{(i-1)}q(Z'; Z^{(i-1)}))}\right\}$$

Step S796, enabling $Z^{(i)}=Z'$ with $\alpha(Z^{(i-1)},Z')$ and enabling $Z^{(i)}=Z^{(i-1)}$ with the probability $1-\alpha(Z^{(i-1)},Z')$; and Step S797, constantly disturbing the parameters of the initial model, repeating the methods of Step S792-Step S796 to achieve the preset number of iterations h, and obtaining posterior samples $Z^{(1)}Z^{(2)}Z^{(3)} \ldots Z^{(h)}$, so as to calculate the matrix at each order of posterior distribution to obtain the expected output value, wherein the expected output value is taken as the high-precision characteristic value simulation result data bodies.

9. The method to claim 1, wherein Step S900 preferably comprises:

Step S910, constructing a template of the cross plot by taking the wave impedance value and the natural GR value as the characteristic parameters sensitive to the reservoir;

Step S920, based on the template of the cross plot and according to the lithological information and the physical information of the individual depth segment, dividing the sample points into fully filled sample points, semi-filled sample points and bed rock sample points;

Step S930, carrying out box selection on the semi-filled sample points with the better reservoir property and calculating to obtain the 2D cross plot interpretation conclusion threshold; and Step S940, inputting the 2D cross plot interpretation conclusion threshold into a 3D natural GR characteristic parameter simulation data body and a wave impedance inversion data body and characterizing the spatial structure morphology of a semi-filled reservoir, so as to obtain the characteristics of the 3D spatial morphology of the semi-filled part of the paleokarst cave;

Step S900 also comprises the step of acquiring other characteristics of the cave:

Step S950, based on the template of the cross plot and according to the lithological information and the physical information of the individual depth segment, dividing the sample points into bed rock sample points, sedimentation filled sample points, chemically filled sample points, collapse filled sample points and mixed filled sample points; carrying out box selection on sample points of all types of fillings; respectively calculating the corresponding interpretation conclusion thresholds; and respectively characterizing the corresponding spatial structure morphologies, so as to obtain the characteristics of the 3D spatial morphologies of the fillings of the paleokarst cave.

10. A system for analyzing filling for a karst reservoir based on spectrum decomposition and machine learning, and describing a structure of the karst reservoir by adopting a lithology shielding technology and a 3D engraving technology for reservoir identification, comprising:

at least one processor and a memory that is in communication connection with the at least one processor, wherein the memory is configured to store instructions capable of being executed by the processor;

an original geophysical logging data acquisition module, a seismic data acquisition module, an original geophysical logging data preprocessing module, a seismic data preprocessing module, a well-to-seismic calibration and characteristic parameter selection module, an isochronous framework model constructing module, an inter-well characteristic parameter simulation module, a module for characterizing the boundary of the inter-well karst cave system, a module for characterizing the lithological and physical boundaries of internal filling of the karst cave and a 3D module for describing the structure and the filling characteristics of the paleokarst cave;

the original geophysical logging data acquisition module is configured to acquire the original logging data of each sample well by the logging equipment, comprising: measuring a self-potential SP of each sample well by a measuring electrode, measuring a natural gamma ray GR of each sample well by a natural gamma ray downhole device and a natural gamma ray ground instrument, and acquiring a caliper CAL of each sample well by a caliper arm; and acquiring data of a resistivity curve: deep lateral logging RLLD, shallow lateral logging RLLS and micro-lateral logging RLLM, and data of a physical property characterization curve: compensated neutrons CNL, a compensated acoustic curve AC and a density curve DEN by traditional logging equipment; and acquire the definite lithological information and physical information of the individual depth segment based on the imaging logging information, the drilling information, the mud logging information and the rock-core information, so as to determine the depth data of the marker bed at the target horizon;

the seismic data acquisition module is configured to acquire the data of the original seismic wave reflected signal by the seismic wave excitation device and the receiving device and acquire isochronous 3D distribution of the marker bed at the target horizon according to a waveform of the data of the original seismic wave reflected signal;

the original geophysical logging data preprocessing module is configured to draw the data of the logging curves based on the original logging data of the sample wells and carry out abnormal value processing and standardization processing, so as to obtain the data of the standardized logging curves;

the seismic data preprocessing module is configured to obtain the high-precision 3D seismic amplitude data body by mixed-phase wavelet estimation and maximum posteriori deconvolution and enhancing diffusion filtering based on the data of the seismic wave reflected signal;

the well-to-seismic calibration and selecting characteristic parameters: acquiring a wave impedance curve of each sample well based on the compensated acoustic curve AC and the density curve DEN in the data of the standardized logging curve, so as to calculate a reflection coefficient curve; acquiring a preferred frequency of a ricker wavelet, so that the preferred frequency is consistent with a dominant frequency of the high-precision 3D seismic amplitude data body; carrying out convolution operation on the ricker wavelet and the reflection coefficient curve, so as to obtain a synthetic seismic record; comparing the depth data of the marker bed at the target horizon and a isochronous 3D distribution of the marker bed at the target horizon for well-to-seismic calibration; calculating a correlation between the synthetic seismic record and a waveform of a near-well seismic channel; and when the correlation is more than or equal to a preset first threshold, judging that a result of well-to-seismic calibration is qualified, so as to obtain the time-depth transforming relationship between the data of the logging curve and the seismic record and the characteristic parameters sensitive to the reservoir, wherein a method for obtaining the characteristic parameters sensitive to the reservoir comprises:

drawing a columnar statistical graph of responses of the logging parameters, which are generated to different geological bodies near the wells; and when a numerical value of data of a certain standardized logging curve used for distinguishing data points that are more than a second threshold preset by different logging interpretation conclusions, selecting the data of the standardized logging curve as the characteristic parameters sensitive to the reservoir, wherein the characteristic parameters sensitive to the reservoir at least comprise the wave impedance IMP and also comprise one or more of the caliper CAL, the natural gamma ray GR, the self-potential SP, the data of the resistivity curve: the deep lateral logging RLLD, the shallow lateral logging RLLS and the micro-lateral logging RLLM, and the data of the physical property characterization curve: the compensated neutrons CNL, the compensated acoustic curve AC and the density curve DEN;

the isochronous framework model constructing module is configured to construct the isochronous framework model based on law of sedimentary strata reflected by the high-precision 3D seismic amplitude data body and the time-depth transforming relationship;

the inter-well characteristic parameter simulation module is configured to determine the parameter of optimal sample number, which reflect the overall geological condition, based on the data of the standardized logging curve of each sample well, determining the parameter of an optimal sample number, which reflect an overall geological condition;

selecting data of the characteristic parameters sensitive to the reservoir of the sample wells to construct an initial model, wherein the data has the highest correlation of the seismic waveforms, and a number of pieces of data is equal to the parameter of the optimal sample number; constantly correcting the parameters of the initial model; and outputting high-precision characteristic value simulation result data bodies, wherein the high-precision characteristic value simulation result data bodies are data bodies corresponding to the characteristic parameters sensitive to the reservoir one to one;

the module for characterizing a boundary of the inter-well karst cave system is configured to draw the histogram of the wave impedance curves based on the wave impedance curves IMP in the characteristic parameters sensitive to the reservoir of the sample wells, and determine the wave impedance threshold for distinguishing the paleokarst cave and the surrounding rock; and based on the wave impedance threshold of the paleokarst cave and the surrounding rock, define the region that is greater than the impedance threshold in the high-precision characteristic value simulation result data bodies as the bed rock of the carbonate rock, and define the region that is lower than the impedance threshold as the development position of the paleokarst cave type reservoir, so as to obtain the structure characteristics and a spatial distribution law of the paleokarst cave type reservoir;

the module for characterizing the lithological and physical boundaries of internal filling of the karst cave is configured to characterize the lithological and physical boundaries of internal filling of the cave: constructing the cross plot based on the characteristic parameters sensitive to the reservoir, and carrying out box selection on the data points in the cross plot as the logging interpretation sample points according to the lithological information and the physical information of the individual depth segment, so as to obtain the interpretation conclusion threshold of the filling degree and the types of the fillings; and carrying out cross analysis on the high-precision characteristic value simulation result data bodies by the interpretation conclusion threshold, so as to obtain the internal filling degree of the cave and the characteristics of a 3D spatial morphologies of the combination of the fillings;

the 3D module for describing the structure and the filling characteristics of the paleokarst cave is configured to describe the structure and the filling of the paleokarst cave: engraving the spatial distribution of the paleokarst cave and the development characteristics of the internal filling, by adopting the lithology shielding technology and the 3D engraving technology, based on structure characteristics and the spatial distribution law of the paleokarst cave type reservoir as well as the internal filling degree of the cave and the characteristics of the 3D spatial morphologies of the combination of the fillings, to generate a diagram characterizing the paleokarst cave;

wherein the system is configured to determine a position of the paleokarst cave of an interval of interest, divide the paleokarst cave into a fully filled reservoir, a semi-filled reservoir and a bed rock reservoir according to the filling degree, and divide a type of the reservoir into a sedimentation filled reservoir, a collapse filled reservoir, a chemically filled reservoir and a mixed filled reservoir by utilizing lithological and physical characteristics of geological bodies, thereby enabling reservoir identification.

* * * * *